Jan. 3, 1961 — G. O. FERM ET AL — 2,967,232
SWITCH AND SIGNAL CONTROL SYSTEM FOR RAILROADS
Filed March 20, 1957 — 14 Sheets-Sheet 1

FIG. I.

INVENTORS
G. O. FERM, W. R. SMITH
AND R. F. ALBRIGHTON
BY
THEIR ATTORNEY

Jan. 3, 1961   G. O. FERM ET AL   2,967,232
SWITCH AND SIGNAL CONTROL SYSTEM FOR RAILROADS
Filed March 20, 1957   14 Sheets-Sheet 3

INVENTORS
G.O. FERM, W. R. SMITH
AND R.F. ALBRIGHTON
BY
Forest B. Hitchcock
THEIR ATTORNEY

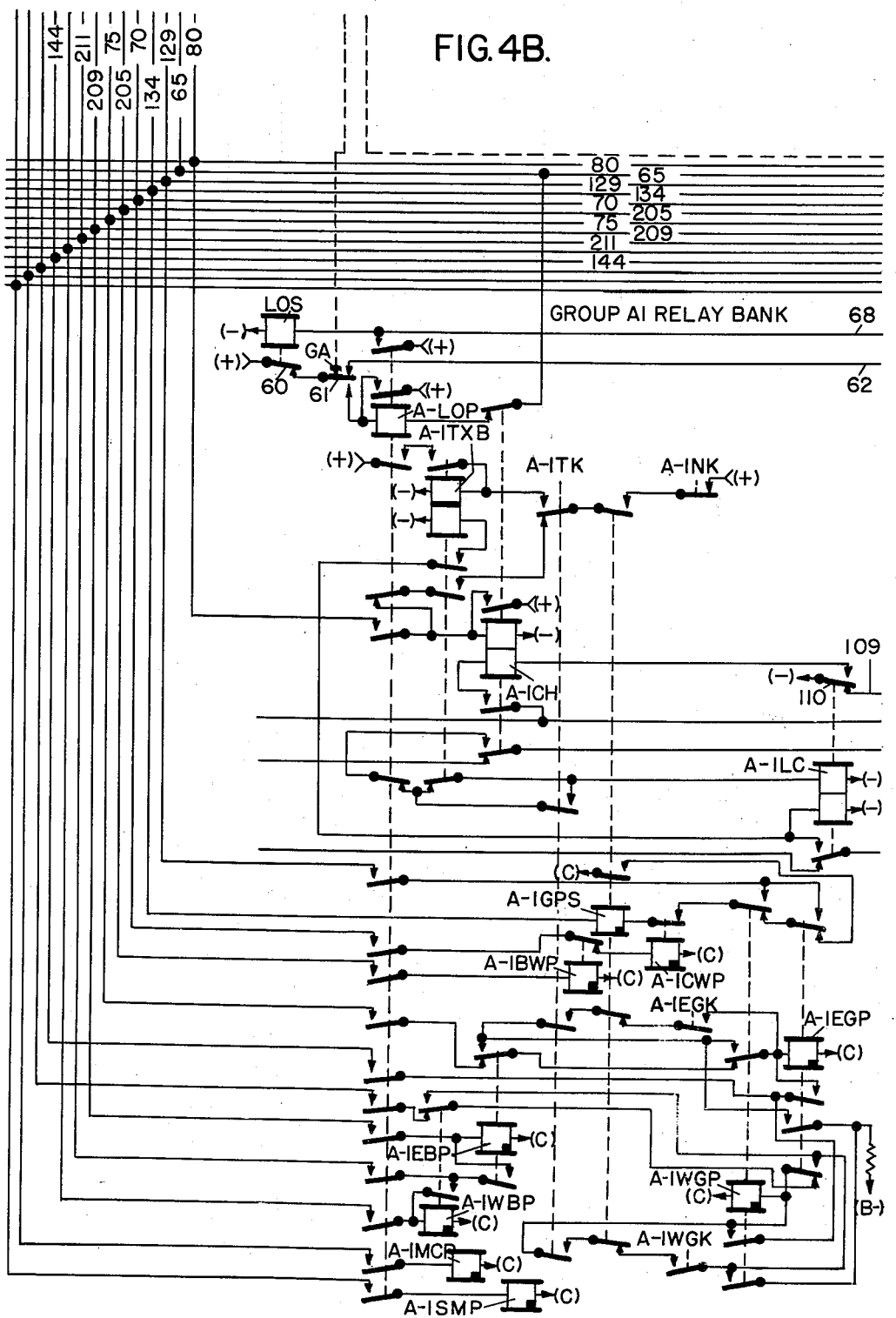

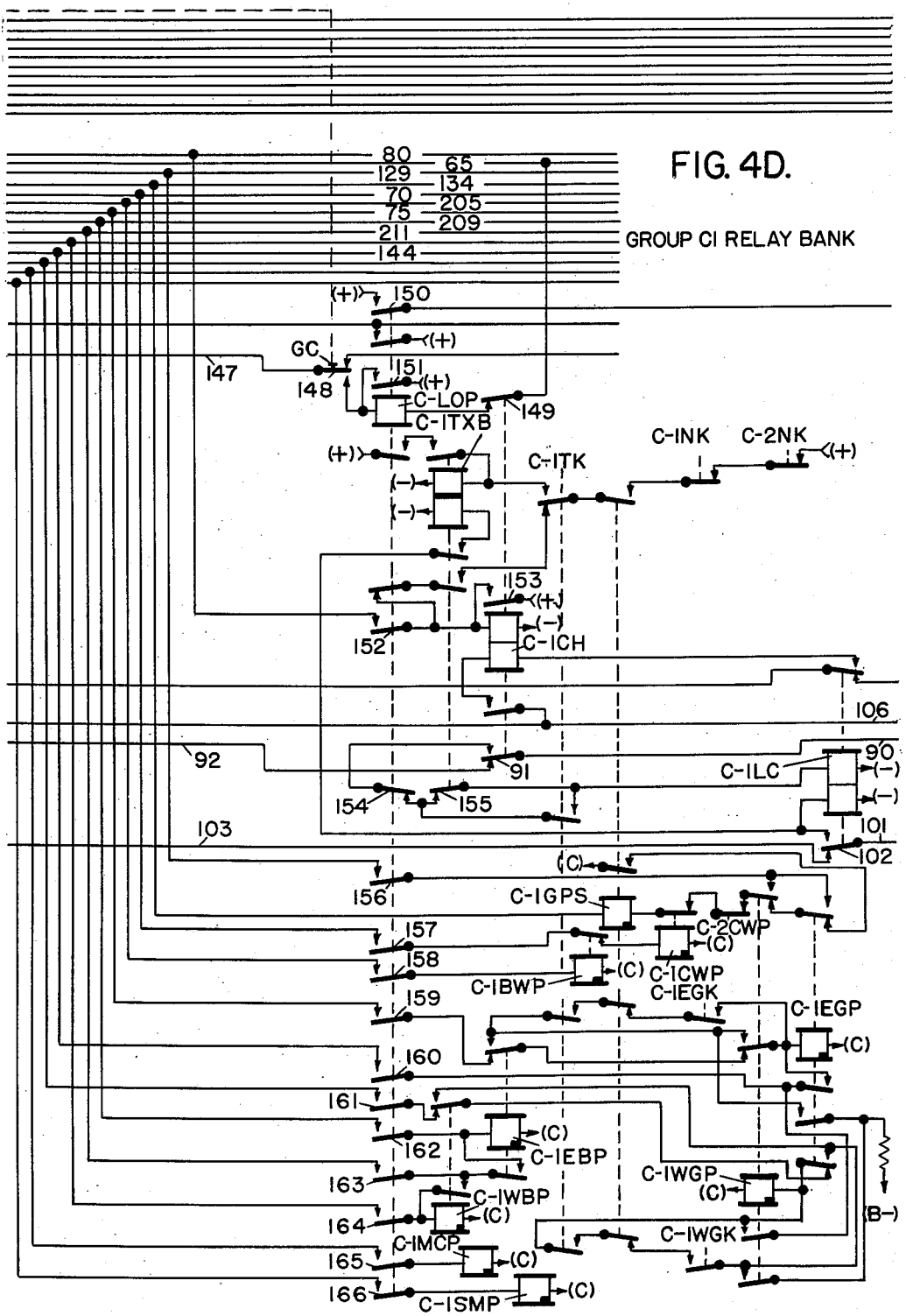

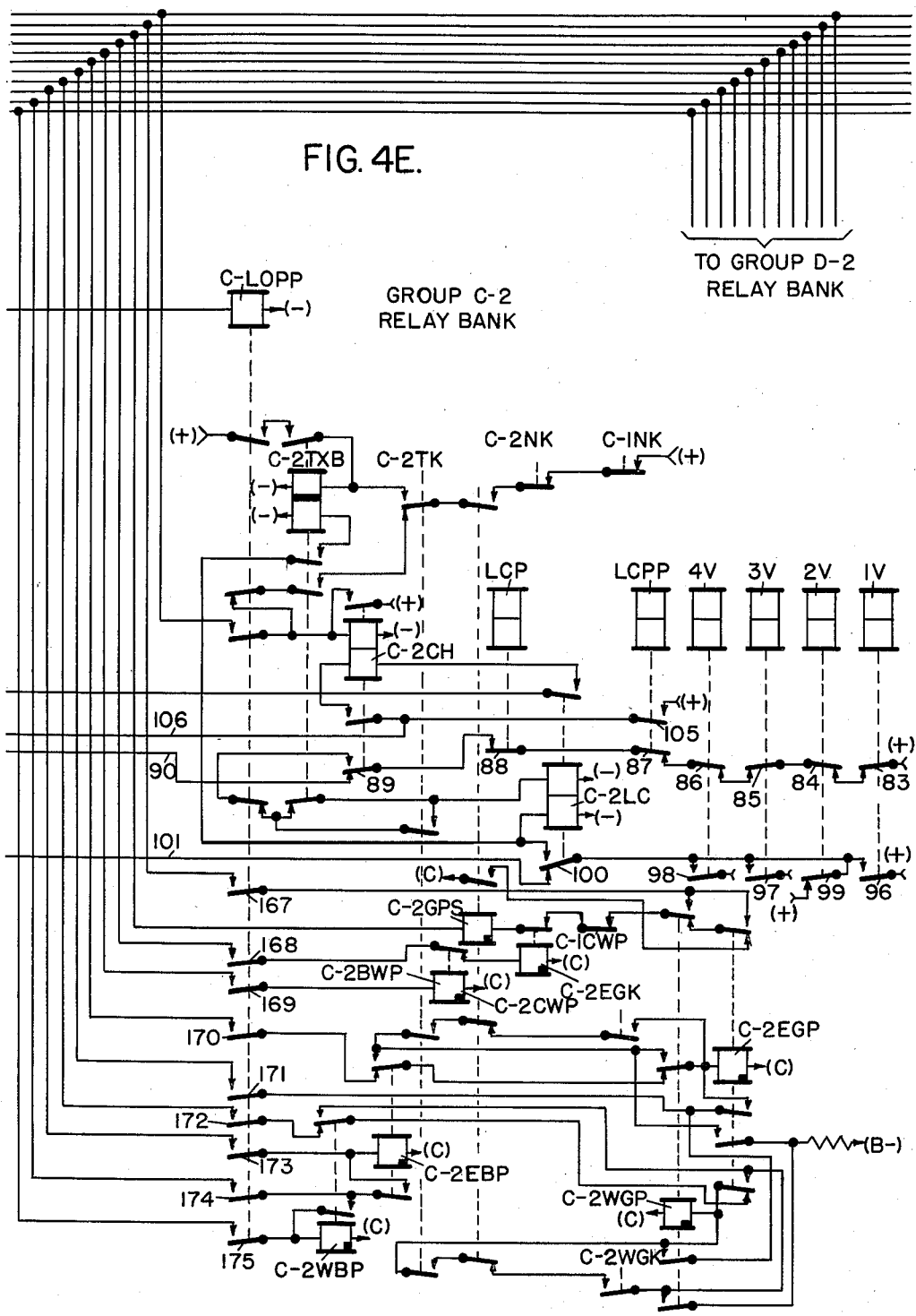

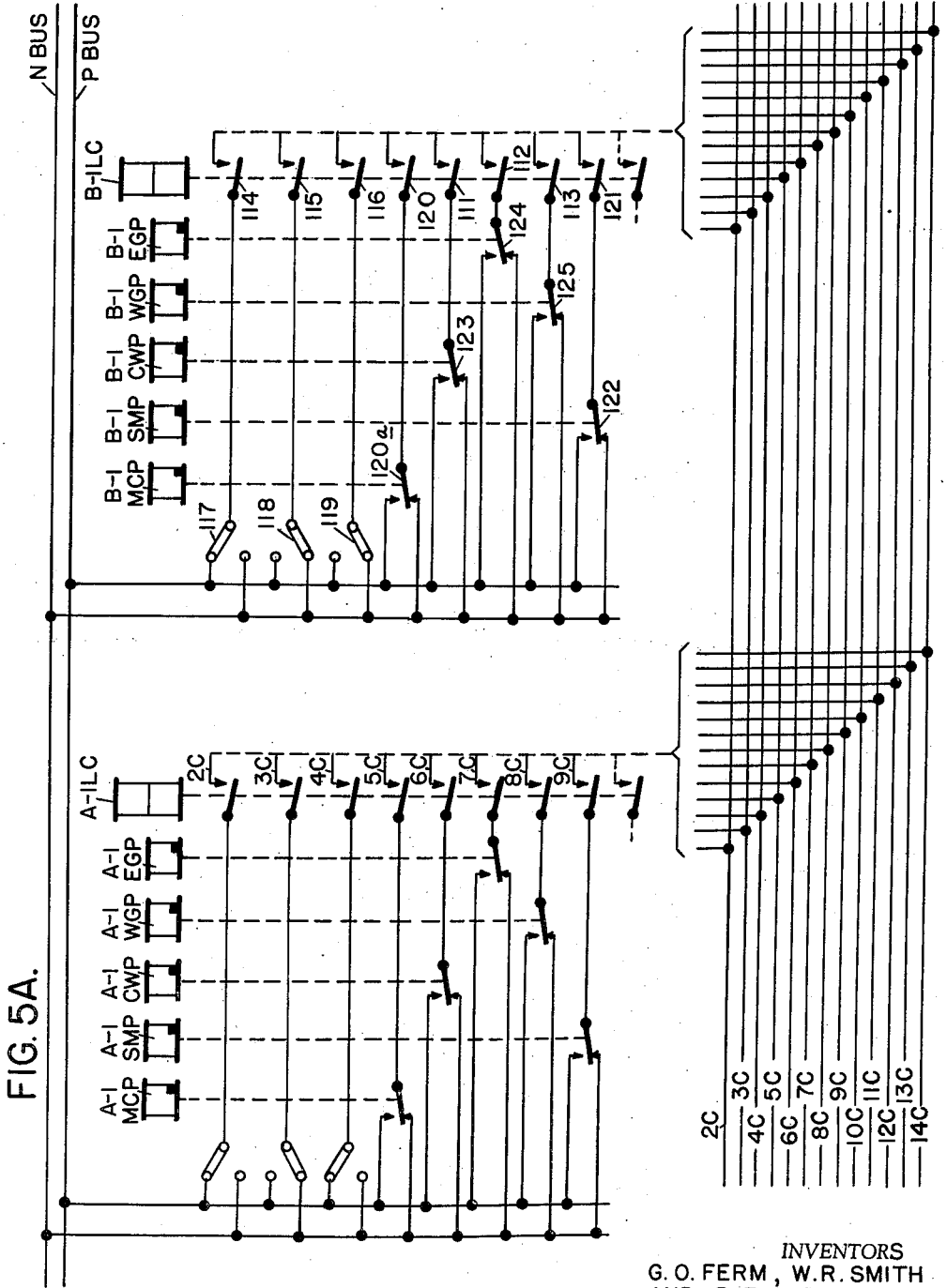

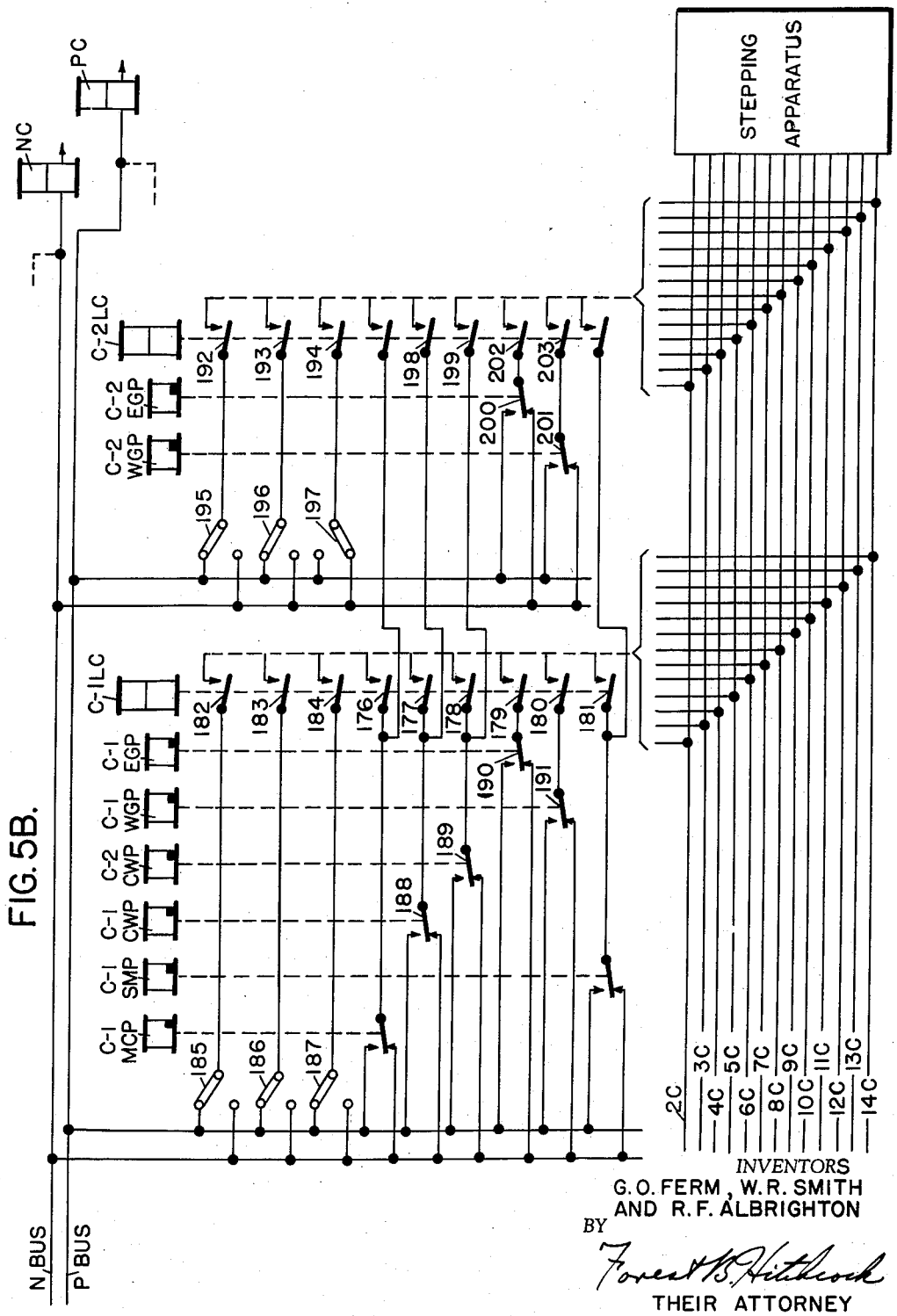

Jan. 3, 1961   G. O. FERM ET AL   2,967,232
SWITCH AND SIGNAL CONTROL SYSTEM FOR RAILROADS
Filed March 20, 1957   14 Sheets-Sheet 10

INVENTORS
G. O. FERM, W. R. SMITH
AND R. F. ALBRIGHTON
BY
Forest B. Hitchcock
THEIR ATTORNEY Jan. 3, 1961 — G. O. FERM ET AL — 2,967,232
SWITCH AND SIGNAL CONTROL SYSTEM FOR RAILROADS
Filed March 20, 1957 — 14 Sheets-Sheet 12

INVENTORS
G.O. FERM, W.R. SMITH
AND R.F. ALBRIGHTON
BY
THEIR ATTORNEY

Jan. 3, 1961  G. O. FERM ET AL  2,967,232
SWITCH AND SIGNAL CONTROL SYSTEM FOR RAILROADS
Filed March 20, 1957  14 Sheets-Sheet 13

INVENTORS
G. O. FERM, W. R. SMITH
AND R. F. ALBRIGHTON
BY
Forest B. Hitchcock
THEIR ATTORNEY

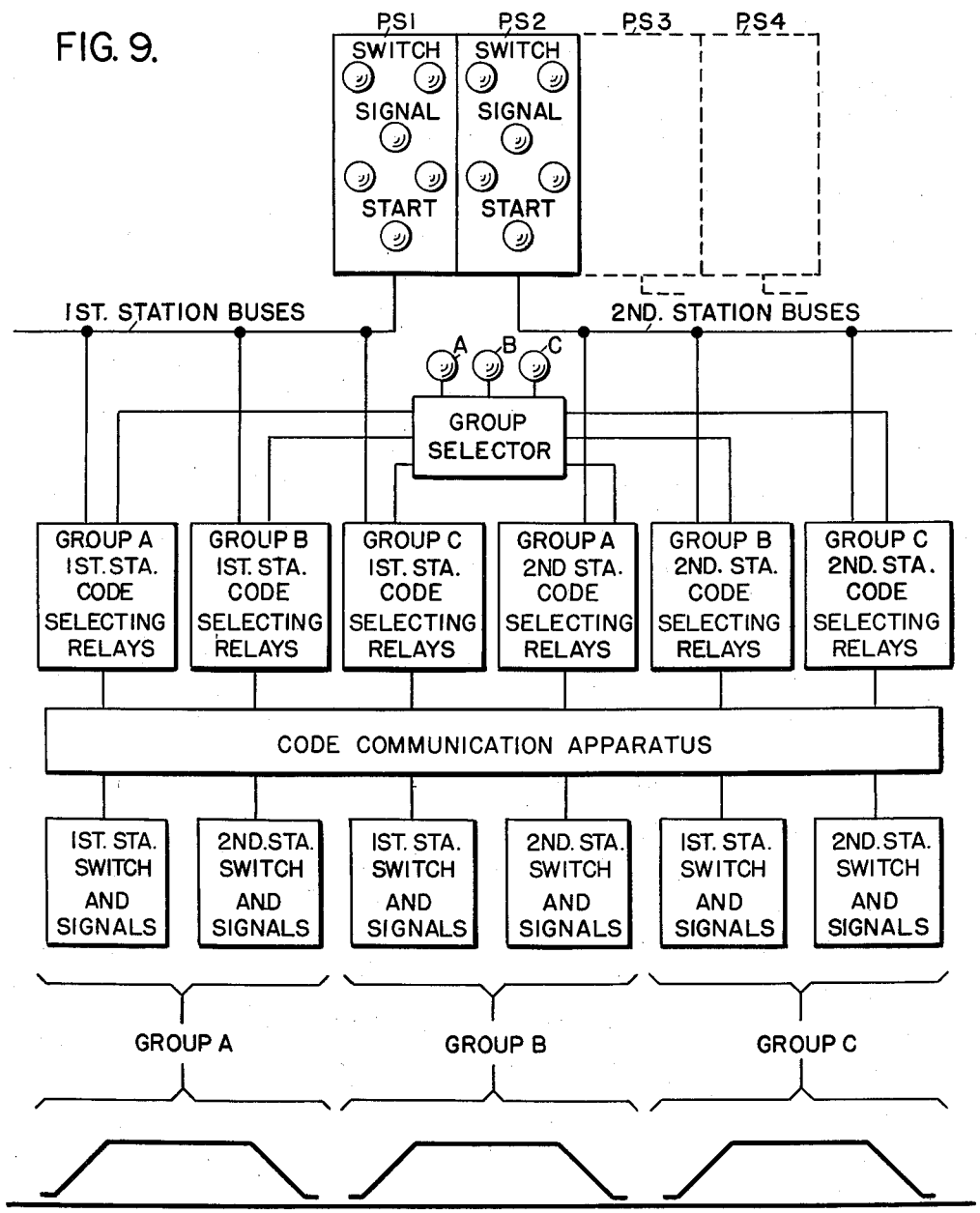

United States Patent Office 2,967,232
Patented Jan. 3, 1961

2,967,232

SWITCH AND SIGNAL CONTROL SYSTEM FOR RAILROADS

Glenn O. Ferm, Willis R. Smith, and Reginald F. Albrighton, Rochester, N.Y., assignors to General Railway Signal Company, Rochester, N.Y.

Filed Mar. 20, 1957, Ser. No. 647,253

19 Claims. (Cl. 246—5)

This invention relates to track switch and signal control systems for railroads, and it more particularly pertains to systems wherein manual supervisory control of traffic through an extensive track layout is accomplished by the remote control of track switches and signals from a compact traffic master control panel on a console type control machine.

In a centralized traffic control system of this general character, a track diagram is required of the track layout to be in view of the operator at the control office and to provide along the trackway of the diagram indications as to the locations of the trains and the conditions of the track switches and signals. Manual control devices for the control of the respective track switches and signals are provided on a control panel of a console machine in front of the track diagram at the control office so that all of the manual control devices necessary to control the signals are within easy reach of an operator seated at the machine.

In the system according to the present invention, the number of manual control devices required is reduced to a minimum to facilitate and simplify the operation on the part of an operator by dividing the control territory into groups of track switches and signals, and making the same manually operable devices effective to select control codes for the control of particular track switches and signals in each of the groups selectively.

Generally speaking, and without attempting to define the scope of the present invention, the control panel on the control machine is divided into a number of similar control sections, the total number of sections required being governed by the greatest number of track switches or signals to be controlled by separate controls in any one group. Each of these panel sections has manually operable devices for respectively designating the controls for a single track switch or crossover and for a single signal or set of opposing signals.

Rather than the respective panel sections being provided for specific track switches and signals, they furnish energy to respective sets of busses, one set of busses being provided for each of the panel sections, from which code selecting relays are operated. The first panel section, for example, feeds a set of busses to which control code selecting relay banks are selectively connected in association with the control of a first track switch and/or a first signal in the respective groups, the control relay bank for only one group being connected to the busses at one time in accordance with the manual designation of the associated group as being the one for which codes are intended to be transmitted. Similarly, when there is a second track switch and/or second signal to be separately controlled in any of the groups, separate second relay banks are provided at the control office for selecting the codes to be transmitted, and all of these second relay banks are controlled selectively from a second set of busses, the energization of which in turn is governed by manual devices on the second panel sections. The third panel section similarly controls a third track switch and/or signal that has to have separate controls in all of the groups having such a switch or signal. In this manner, the controls are built up for the different track switches and signals until the maximum number of track switches and/or signals having separate controls for any group is reached. Thus, the number of panel sections required is in accordance with the greatest number of different track switch or signal controls required in any one group.

The circuits of the relay banks are adapted for the use of self-restoring pushbuttons as the manually operable devices on the respective panel sections for designation of different switch and signal controls. Certain of these pushbuttons are made to have a dual purpose in connection with switch and track blocking or fleeting by pulling the buttons out from positions in which they are normally biased. Track blocking is desirable, for example, to prevent inadvertently putting a train into a stretch of track that is temporarily out of service for repairs. A similar condition may exist with respect to a track switch. Fleeting is rendered effective by the joint actuation of a fleeting manual control device and the manual control device on a panel section for a signal for which this fleeting control is to be effective at a selected group. When fleeting control is rendered effective, code communication apparatus automatically rendered effective after passage of each train past the associated signal to communicate a control to clear such signal for governing the passage of another train over the same route.

The designation of respective groups of track switches and signals for which designated controls are intended is accomplished by selective actuation of a bank of manually operable devices, and circuit interlocking means is provided to render controls to be effective for the control of track switches and signals in any one group at any one time.

An object of the present invention is to control the track switches and signals of a plurality of groups of track switches and signals in an extensive track layout from a console type control machine having a sectional control panel of which each section has control devices for designation of a track switch and a signal, and the number of panel sections required is determined by the maximum number of different track switch or signal controls for any one of the groups.

Another object of the present invention is to selectively control banks of code selecting relays at the control office for the respective groups from a single set of busses that are selectively energized by the devices on a single one of the panel sections.

Another object of the present invention is to provide a relay bank controlling a set of busses for each of the panel sections.

Another object of the present invention is to provide that a relay bank of only one group may be connected to its set of busses at one time.

Another object of the present invention is to connect all of the relay banks contemporaneously to their respective sets of busses for any one group when that group has been designated as the group to which switch and signal controls are to be communicated.

Another object of the present invention is to indicate the particular group selected for control by the devices on the panel section by a visual indicator on the track diagram of the entire territory and by the display of a diagram of the track area of the selected group on the console machine.

Other objects, purposes and characteristic features of the present invention will be in part obvious from the accompanying drawings and in part pointed out as the description of the invention progresses.

In describing the invention in detail, reference is made to the accompanying drawings in which similar letter reference characters have been used to designate parts having similar features or functions and in which.

Figure 6:
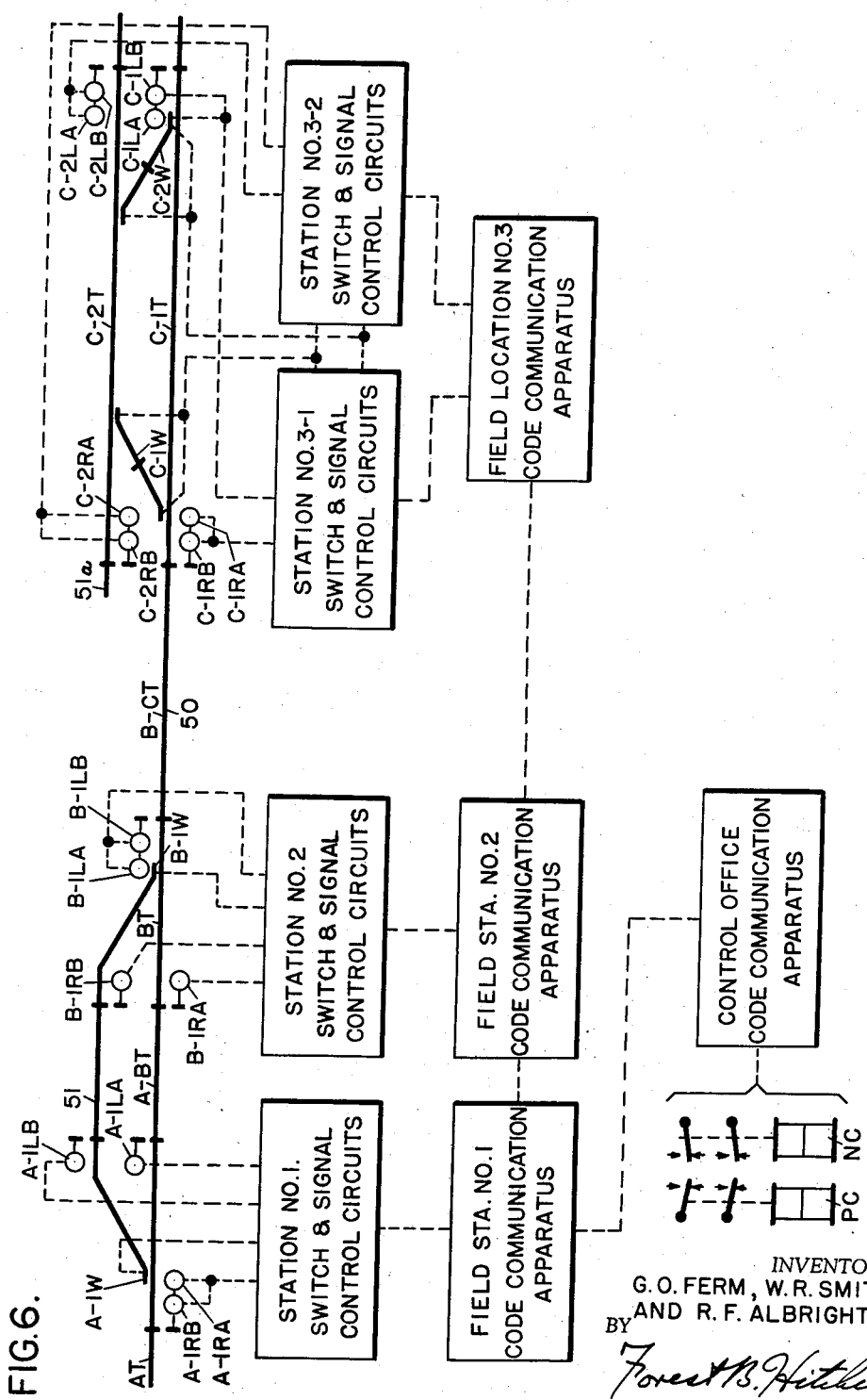
Figure 7A:
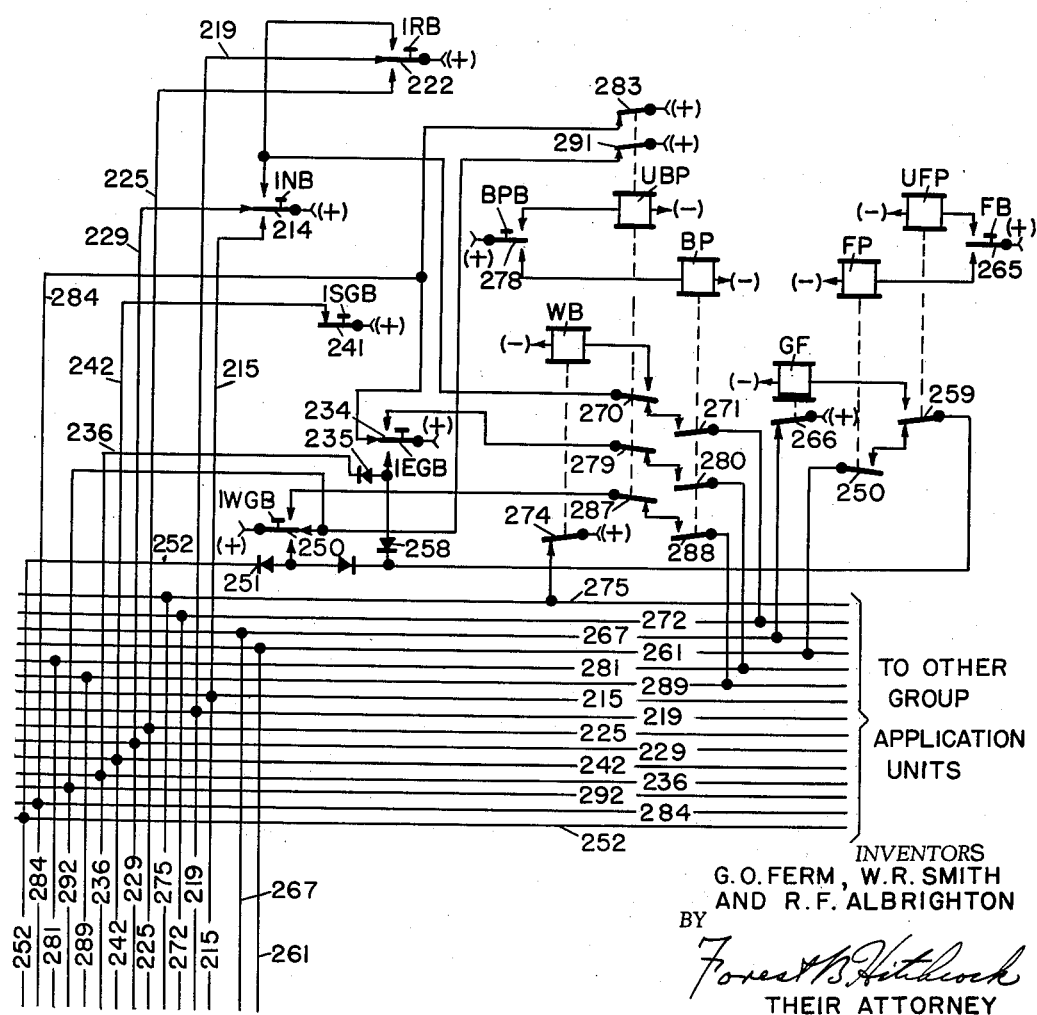
Figure 7B:
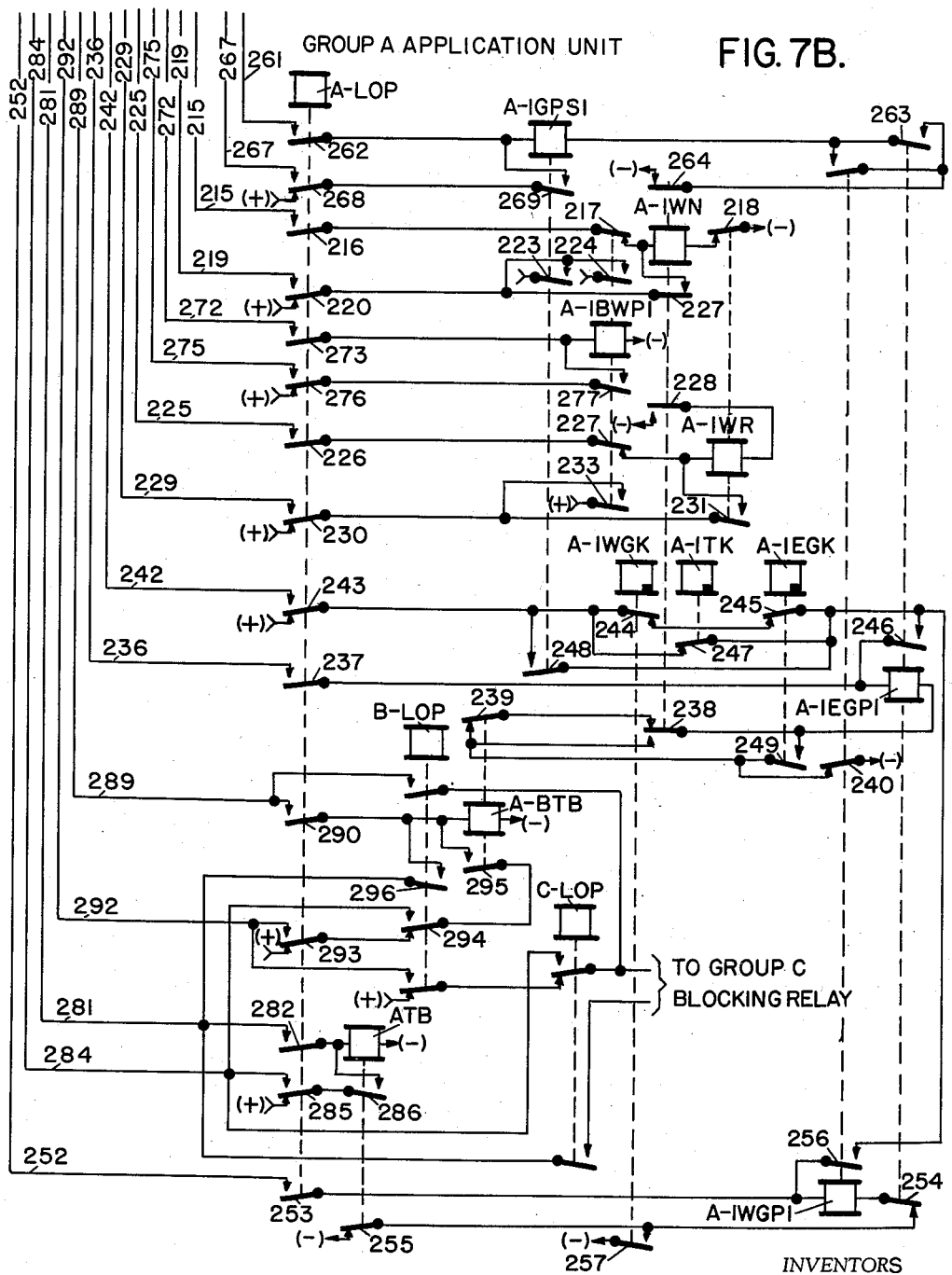
Figure 8:
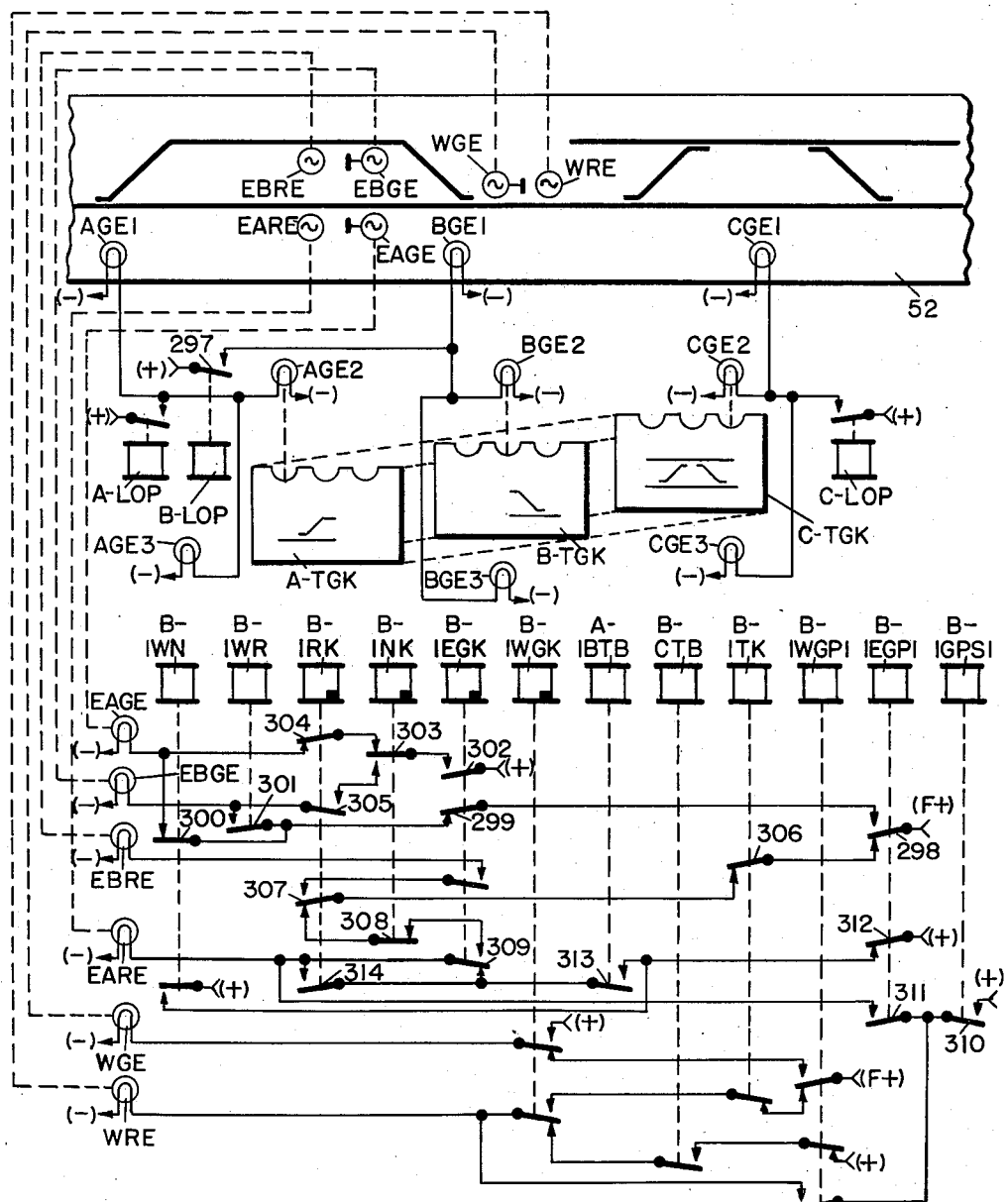

Figs. 4A through 4E (Figs. 4B through 4E being placed side by side and Fig. 4A being placed above Figs. 4B and 4C) illustrate a plurality of banks of switch and signal control code selecting relays and their control circuits;

Figs. 5A and 5B when placed end to end illustrate the selection of codes by the different relay banks of Figs. 4B through 4E for transmission over the code communication apparatus;

Fig. 6 illustrates means for controlling the track switches and signals by control codes transmitted from the control office;

Figs. 7A and 7B, when placed one above the other, illustrate a modified form of control for a typical track switch and signal code selecting relay bank;

Fig. 8 illustrates a system of indications provided on the track diagram and on the console machine for a typical group of track switches and signals; and Fig. 9 illustrates by block diagram how the system can be applied to a different grouping of the track switches and signals.

The illustrations employed in the disclosure of the present invention have been arranged to facilitate the disclosure of the invention as to its mode of operation and the principles involved rather than for the purpose of illustrating the construction and arrangement of parts that would be employed in practice. Thus the relays and their contacts are shown in a conventional manner and conventional schematic diagrams are used with contacts of certain relays being shown in written circuit form and identified as of particular relays by corresponding reference characters appearing directly above such contacts. The symbols (+) and (—) have been used to identify respective positive and negative terminals of suitable batteries or other sources of direct current and the symbols (B+) and (B—) have been used to indicate connection to the respective positive and negative terminals of a battery or other source of direct current having a center tap connection designated as (C).

For the purpose of simplifying this disclosure of the present invention, the present invention is shown as being applied to a relatively simple track layout that may be considered as being a typical part of an extensive track layout, or that may be considered as just illustrating typical circuits which may be applied by a person skilled in the art to the control of track switches and signals in different and more complex arrangements of track switches and signals in more extensive track layouts.

The track layout for which one embodiment of the present invention is provided is illustrated in Fig. 6 as having a main stretch of track 50 to which a passing siding 51 is connected by the track switches A–1W and B–1W, and the main stretch of track 50 is also illustrated as having a second parallel track 51a connected thereto for double direction traffic by crossover C–1W and C–2W. Eastbound and westbound signals RA and RB, and LA and LB respectively are provided for governing traffic over the respective track switches in the usual manner. The track switches and signals are subject to supervisory control from the control office.

The track switches and signals at the left hand end of the passing siding 51 are in group A; the track switches and signals at the right-hand end of the passing siding 51 are in group B; and the track switches and signals associated with the connection of the tracks 50 and 51a for double direction traffic are in group C.

This grouping of the track switches and signals corresponds to the grouping by field locations of the switches and signals as far as the code communication apparatus is concerned, but these groupings do not necessarily have to correspond to the field location grouping as will be more readily apparent as the description of the invention progresses. In other words, the grouping of the track switches and signals for code selecting purposes is a matter of choice, substantially irrespective of the geographic location of the track switches and signals involved.

Figure 1:
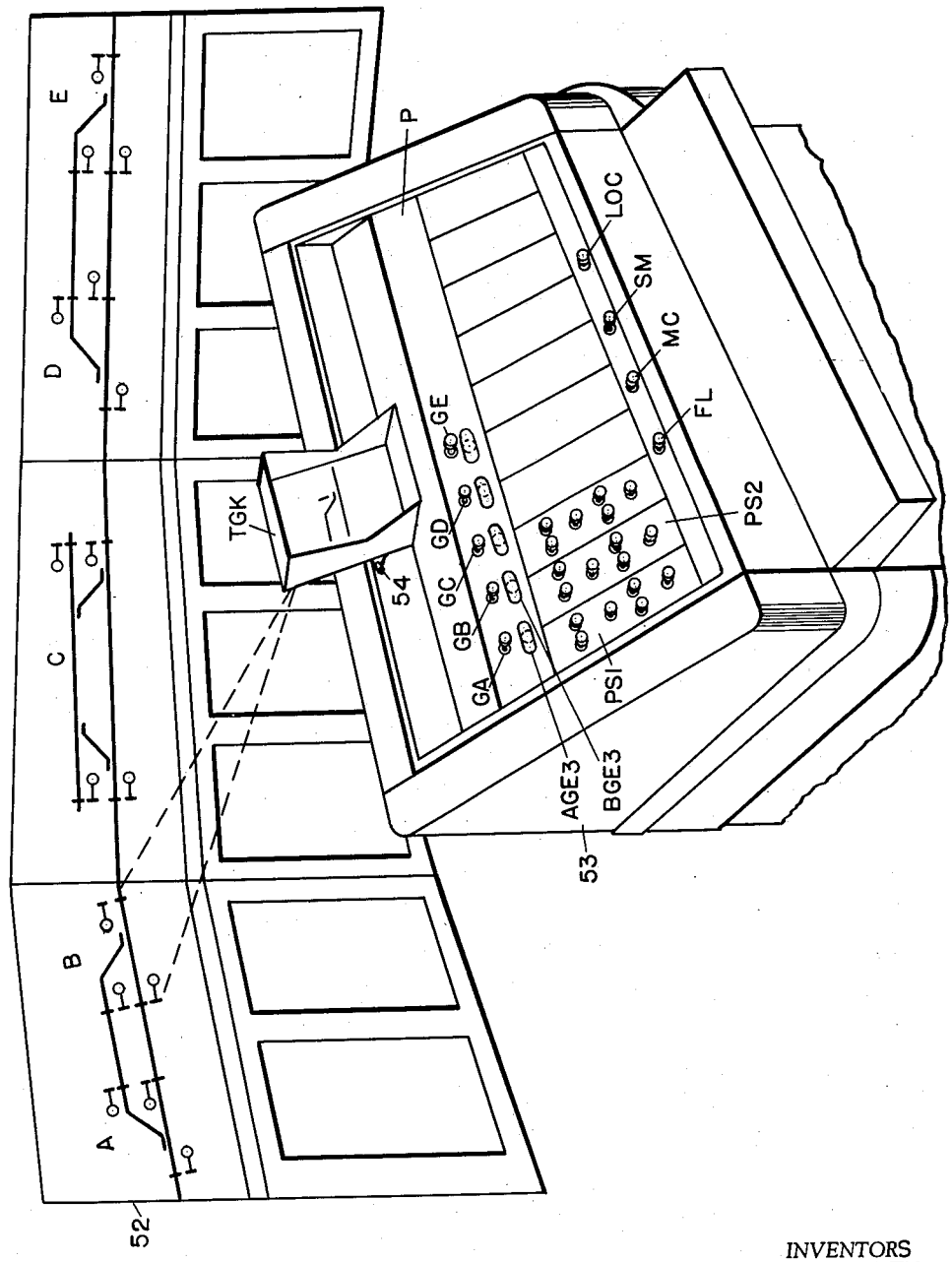
Fig. 1 is a view in perspective of a track diagram and a console control machine for use in a traffic master type of centralized traffic control system.

With reference to Fig. 1, a track diagram 52 is constructed in a control office in front of a console type control machine 53. This diagram corresponds to the track layout for which the system is provided and it includes various switch and signal indicating lamps (see Fig. 8), track occupancy indicating lamps, track and switch blocking indicator lamps and indicators for the respective groups of track switches and signals.

The console type control machine comprises an inclined control panel P which in turn includes a plurality of similar panel sections PS for the designation of track switch and signal controls for communication to the respective groups of track switches and signals. A row of group designation buttons G is provided across the top of the panel sections PS and various other system control buttons are disposed below the panel PS.

Figure 4A:
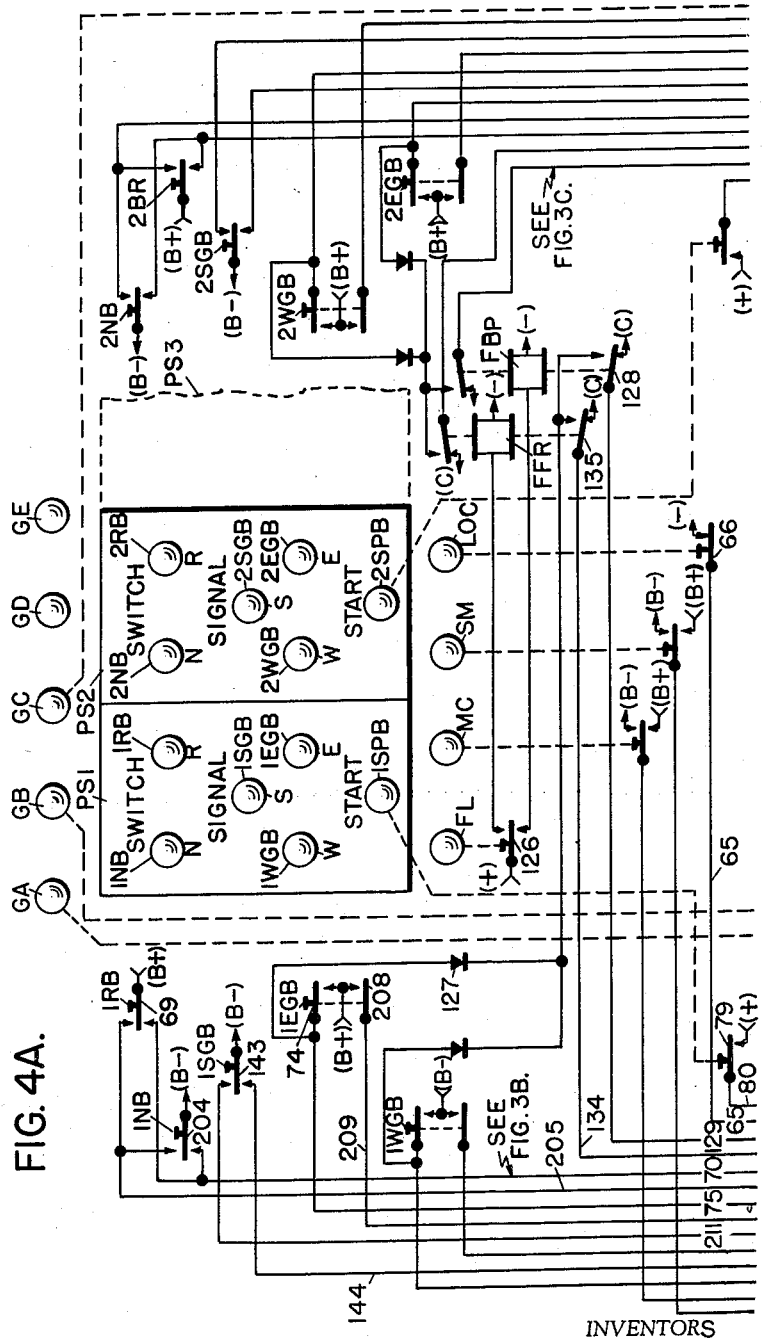

Each of the panel sections PS has control buttons mounted thereon as is illustrated in Fig. 4A. These buttons are assumed to be push-pull buttons having a neutral position in which they are biased. Considering specifically the arrangement of the buttons on the panel PS1 as typical, at the top of the panel buttons 1NB and 1RB are disposed side by side for the designation of the respective normal and reverse positions of a track switch; the button directly below the switch control buttons is a stop control button 1SGB for the signals; below the stop button 1SGB signal control designating buttons 1WGB and 1EGB are disposed side by side for designation of controls for governing westbound and eastbound signals respectively; and below the signal control buttons is a start button 1SPB for initiating the transmission of controls that have been designated to the particular group of track switches and signals that has been selected in accordance with group designation.

Above the control panel P on the console machine 53 (see Fig. 1) is pivotally mounted a changeable track group indicator which is selectively controlled to display the track layout of any designated group for which controls are intended. This indicator is mounted by a pivoted bracket mounting 54 so that it can be radially adjusted in accordance with the line of sight of an operator seated in front of the machine.

The construction of the changeable track group indicator can be provided as is disclosed, for example, in the prior U.S. patent application of Carlton T. Jackson, Ser. No. 625,381, filed November 30, 1956, now abandoned.

It is to be understood that the system provided by the present invention can employ different types of code communication systems for communicating the selected switch and signal control codes from the control office to the different field stations, but, for the purpose of specific illustration of one embodiment of the present invention, the invention has been particularly adapted for use with the code communication apparatus disclosed in the prior U.S. patent application of N. B. Coley, Ser. No. 563,637, filed February 6, 1956. Reference is to be made to this prior disclosure for detailed description as to the apparatus employed for code communication purposes, much of this apparatus being illustrated in various sheets of drawing in the present application only in block form as it is to be understood that the apparatus employed can be the same as that which is specifically disclosed in the above mentioned Coley application.

With reference to Figs. 4B through 4E location selecting relays LOP and LOPP are provided for selectively connecting the different banks of switch and signal code selecting relays to the control buttons on the control panel in accordance with the designation of the respective groups for the communication of controls. These relays LOP and LOPP have a repeater relay LOS (see Fig. 4B) associated therewith for the purpose of permitting only one group selector relay to be energized at any one time.

Control cycle start and interlocking relays CH, LC and LCP (see Figs. 4B through 4E) are provided to govern the operation of the code communication system in respective cycles of operation so that the controls go out to the respective field stations successively in case a second control is designated before a first control has been transmitted.

Magnetic stick switch control relays CWP are provided at the control office for selecting the track switch control codes for transmission to associated track switches, and neutral relays WN and WR of Fig. 7B are used for similar purpose, relay WN being provided for controlling the operation of a track switch to its normal position, and relay WR being provided for controlling the operation of a track switch to its reverse position.

Magnetic stick signal control relays EGP and WGP are provided for selecting signal control codes for transmission from the control office for the control of the different signals, the relay EGP being used to select codes for governing eastbound signals, and the relay WGP being used to select codes for governing westbound signals. Neutral relays EGP1 and WGP1 shown in Fig. 7B are provided for similar purposes.

Neutral relays FFP, FBP, TXB and GPS are used in providing fleeting controls for the different signals when such controls have been designated by an operator. Relays FP, UFP and GF of Fig. 7A are provided for similar purposes.

Switch and signal blocking relays BWP, EBP, WBP and track blocking relay TB are provided in the code selecting relay banks for the different groups of track switches and signals for the blocking of different routes and track switches where these routes are not to be used for the period of time during which the blocking remains effective.

Relays MCP are provided for selecting control codes for calling a maintainer at the associated field station, and the relays SMP are provided for governing snow melters at the respective stations.

Magnetic stick track indication relays TK, switch indication relays NK and RK for the respective normal and reverse positions of associated track switches and signal indication relays EGK and WGK for signals governing eastbound and westbound traffic respectively are controlled by code communication apparatus and conditioned in accordance with the general practice of indicating the conditions of occupancy of the various track sections, and the conditions of the track switches and signals in the field.

Various indicator lamps E (see Fig. 8) are provided for indicating the conditions established or to be established in the setting up of routes.

Various relays belonging to the code communication apparatus have been shown in block form in Fig. 4E, and reference is to be made to the above mentioned application of N. B. Coley for a more complete disclosure as to how these relays are controlled. Included in this group of relays are the stepping relays 1V, 2V, 3V and 4V and cycle control relays LCP and LCPP. These relays are to be understood as corresponding to relays in the above mentioned application of N. B. Coley identified by similar reference characters.

Code transmitter relays PC and NC (see Figs. 5B and 6) have their circuits only partially shown, the dotted portion of their circuits indicated in Fig. 5B being used to indicate connections of circuits shown in detail in the above mentioned application of N. B. Coley.

Having thus described the general organization of the system provided by the present invention, detailed description of the circuits will be hereinafter considered upon consideration of the mode of operation of the system under various typical operating conditions.

*Operation*

Before considering the specific circuits involved in the mode of operation of the system, consideration will be given to the general mode of operation in the establishment of routes by the system provided by the present invention.

With reference to Fig. 1, when an operator desires to set up a route for a train in any one of the groups A, B, C, D or E, he first designates the group in which he wants the route established by actuation of a button G corresponding to that route on the control panel P above the panel sections PS. This actuation causes the changeable track group indicator TGK to be illuminated to display on the console machine a diagram of the particular track layout of the group that has been designated. Also, an indicator is illuminated directly below the group button G that has been actuated so as to indicate on the console machine the particular group that has been designated. This indication is desirable in addition to the display on the track indicator TGK because the trackway illuminated in the indicator TGK may be common to several different groups. In addition to these indications, a group indicator lamp disposed with its associated group of track switches and signals on the large track diagram is illuminated as is illustrated in Fig. 8.

Upon observing the numbering of the track switches and signals on the diagram of the track group indicator TGK, the operator then proceeds to actuate control buttons for the track switches and signals he wishes to control on the respective panel sections having PS numbers corresponding to the numbers of the track switches and signals. Thus, for example, if the operator in setting up his route wishes to operate the track switch No. 1 in a designated group he designates the normal or reverse position for this track switch by the actuation of a switch control button on the panel sections PS1, and if he wishes to operate track switch No. 2 in the group illustrated by the group track indicator TGK, he actuates the switch control button for the normal or reverse position of the track switch on the second panel section PS2. Thus, the panel sections are associated with the numbering of the track switches and signals in the respective groups, the switches and signals in each of the respective groups being numbered successively starting with the number 1.

Therefore, dependent upon the complexity of the track layout of the group that the operator has designated, switch and signal control buttons are operated on one or more panel sections PS in accordance with the different numbers assigned to the track switches and signals that are required to be controlled to establish a desired route. It is not necessary that the operator actuate a button for each track switch in the route if he knows that such track switch has last been operated to a position in correspondence with the route he wishes to establish. In other words if the track switch is already normal and the normal position is required for the route the operator wishes to establish, it is not necessary for him to actuate a button for the normal position of that track switch because a relay in a relay bank belonging to the associated group has stored the condition last designated for such switch, and when the switch control codes are selected, a normal control code will automatically be selected for the track switch involved in accordance with a prior designation.

After having designated all of the track switches required to be operated to establish the route, the operator then actuates a signal control button to designate the signal to be cleared, and after this actuation, the relays of the code selecting relay bank belonging to the associated group have been properly conditioned to select the code for transmission, and the actuation of a start button at the bottom of the panel section PS belonging to the signal having its control designated will cause initiation of the code communication apparatus into a cycle of operation for transmission of the controls that have been designated to the field station belonging to the designated group.

Figure 2:
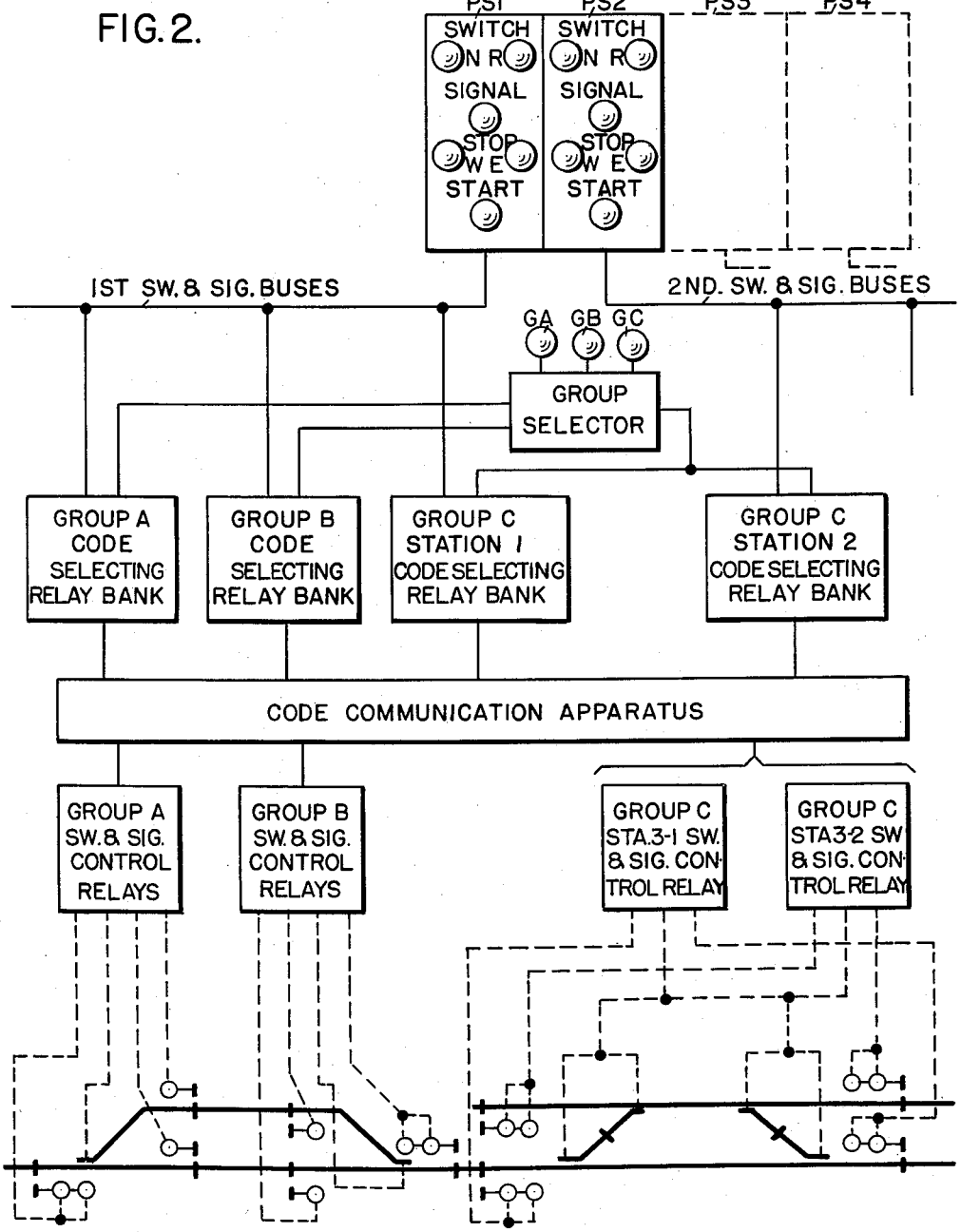
Fig. 2 is a block diagram of the system organization provided for one embodiment of the present invention.
Figure 3:
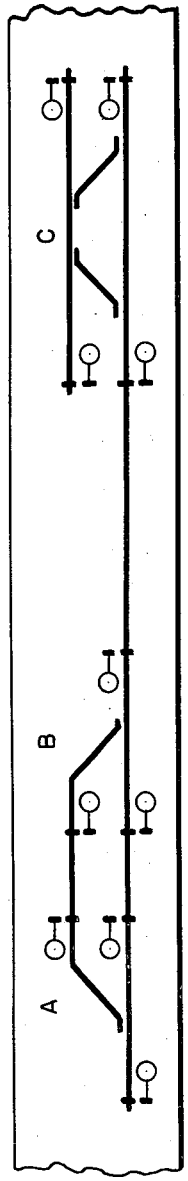
Fig. 3 is a view of a section of a track diagram.

The above described mode of operation is accomplished by apparatus illustrated by block diagram in Fig. 2 wherein each of the panel sections PS has associated therewith a set of control buses. The first switch and signal buses, for example, are associated with the panel section PS1, and these buses provide control for code selecting relay banks for each of the groups because the panel section 1 is used in designation of a track switch and a signal in each of the groups. Where there is no more than one track switch or signal in a group, the panel section PS1 is the only panel section that is used in the designation of switch and signal controls for that group, but for groups having more than one track switch or signal, as is the case in group C, panel section PS2 is also used together with other panel sections PS as required where there are more than two track switches and/or signals in any one group.

It will be noted according to the diagram of Fig. 2 that a group selector influences the relay banks as to whether or not they are to be rendered responsive to energy applied by the buttons of the various panel sections to their associated sets of buses. This group selector comprises relays LOP (see Figs. 4B to 4E inclusive) which are controlled directly by associated group designation buttons G on the control panel P. Thus, according to the diagram of Fig. 2, if an operator actuates the button GA for designation of group A as being the group to receive the signal controls, this renders the group A code selecting relay bank responsive to energization of the first switch and signal buses in accordance with the actuation of the switch and signal control buttons selectively on the panel section PS1. This group selecting apparatus also includes a relay LOS (see Fig. 4B) which provides that only one group selector relay can be picked up at one time, and thus only the first designated group can have its code selecting relay bank responsive to designated switch and signal controls. This group interlock is maintained until the designated switch and signal controls for the group that has been designated are transmitted to the field, or until a cancellation button is actuated to cancel the group designation.

As is indicated in the block diagram of Fig. 2, the code selecting relay banks for the different groups select the codes to be transmitted by code communication apparatus, but only one of these banks may be connected at any one time to the code communication apparatus in accordance with the above described group selection. The communication to the field of the switch and signal control codes that have been selected is in accordance with usual practice and may be accomplished by any of the means well known to those skilled in the art.

To consider more specifically the circuits involved in the above described general mode of operation, it will be assumed that the group B is designated as has been described by the actuation of the button GB (see Figs. 4A, 4B and 4C) to its depressed position. This actuation causes the picking up of relay B–LOP by the energization of a circuit extending from (+), including back contact 60 of relay LOS (see Fig. 4B), contact 61 of group button GA in its normal position, wire 62, contact 63 of button GB in its depressed position, winding of relay B–LOP, back contact 64 of relay B–1CH, bus wire 65, and normally closed contact 66 of the group cancel button LOC at the bottom of the control panel P, to (−).

The picking up of relay B–LOP causes the picking up of the relay LOS to lock out the response of any other group relay. The circuit by which relay LOS is energized extends from (+), including front contact 67 of relay B–LOP (see Fig. 4C), wire 68, and winding of relay LOS, to (−). This relay when picked up opens the circuit providing pick up energy for all of the relays LOP at back contact 60, but relay B–LOP is maintained picked up by a stick circuit closed at front contact 63 which shunts out that portion of the pick up circuit including contact 60 of relay LOS and contact 63 of the group designation button GB. The picking up of relay B–LOP, by closing the front contacts of this relay, connects the relays of the code selecting relay bank belonging to that group respectively to control buses belonging to the set of buses associated with the panel section PS1.

The operator next proceeds to designate the position of the track switch he desires for the route to be established and if he actuates the button 1RB on panel section PS1 (see Fig. 4A), a code is selected for the operation of the associated track switch in group GB to its reverse position. Relay B–1CWP is energized in response to this designation by a circuit extending from (B+), including contact 69 of button 1RB in its depressed position (see Fig. 4A), wire 70, front contact 71 of relay B–LOP, back contact 73 of switch blocking relay B–1BWP, and winding of relay B–1CWP, to (C). If the operator had actuated the button 1NB on the panel section PS1 rather than the button 1RB, the relay B–1CWP would have been actuated by reverse polarity to its opposite position (corresponding to the position in which it is shown) for selecting a code for transmission calling for the track switch No. 1 in group B to be actuated to its normal position.

If it is assumed that eastbound traffic is to be established through the track switch in group B, the operator actuates the signal control button 1EGB to its depressed position on the panel section PS1, and in accordance with this actuation the signal control relay B–1EGP is picked up to select a signal clearing code for transmission to control the eastbound signals at station B. The circuit by which relay B–1EGP is picked up at this time extends from (B+), including contact 74 of button 1EGB in its depressed position, wire 75, front contact 76 of relay B–LOP, back contact 77 of relay B–1EBP back contact 78 of relay B–1WGP and winding of relay B–1EGP, to (C). Relay B–1EGP is picked up in response to this energization and in its picked up position it selects a signal clearing code for transmission to its associated signal in the field. A similar mode of operation is accomplished when a signal for westbound traffic is designated by the actuation of the button 1WGB on the panel section PS1 wherein the relay B–1WGP (see Fig. 4C) becomes picked up.

Having thus completed the designation of the switch and signal controls to be transmitted for group B, the operator now can cause transmission of the designated controls by actuation of the start button 1SPB on the same panel section PS1 as the switch and signal control buttons which have been actuated. This actuation causes the picking up of relay B–1CH by the energization of a circuit extending from (+), including contact 79 of start button 1SPB, wire 80, front contact 81 of relay B–LOP, and upper winding of relay B–1CH, to (−). This relay when picked up is maintained energized through an obvious stick circuit closed at front contact 82 of relay B–1CH. Relay B–1CH when picked up causes the dropping away of the group selector relay B–LOP by the opening of its circuit at back contact 64, but the associated bank of code selecting relays that has been conditioned as has been described is maintained in its last operated position because of the relays being of the magnetic stick type so as to maintain their last actuated positions.

When the code communication system is available for the transmission of the controls that have been designated, the relay B–1LC becomes picked up by the energization of a circuit extending from (+), including back contacts 83, 84, 85, 86 and 87 of code communication relays 1V, 2V, 3V, 4V and LCPP respectively (see Fig. 4E), front contact 88 of relay LCP, back contact 89 of relay C–2CH, wire 90, back contact 91 of relay C–1CH, wire 92, front contact 93 of relay B–1CH, back contact 94 of relay B–LOP, back contact 95 of relay B–1TXB, and upper winding of relay B–1LC, to (−). This relay when picked up is maintained energized by a stick circuit which is maintained closed until the end of a cycle of operation of the code communication system for the communication of the designated controls to the field station. The stick circuit by which relay B–1LC is energized extends from (+), including front contacts 96, 97 and 98 of relays 1V, 3V and 4V respectively (see Fig. 4E) connected in multiple with back contact 99 of relay 2V, back contact 100 of relay C–2LC, wire 101, back contact 102 of relay C–1LC, wire 103, front contact 104 of relay B–1LC, and lower winding of relay B–1LC, to (−).

The picking up of relay B–1LC causes the dropping away of its associated change relay B–1CH by the energization of its lower winding with reverse polarity as compared to the energization of the stick circuit for that relay. The energization of the lower winding is provided by a circuit extending from (+), including front contact 105 of relay LCPP (see Fig. 4E), wire 106, front contact 107 of relay B–1CH, lower winding of relay B–1CH, front contact 108 of relay B–1LC, wire 109, and back contact 110 of relay A–1LC, to (−).

With reference to Fig. 5A, the picking up of relay B–1LC connects contacts of the code selecting relay bank to the code communication stepping channel wires C respectively through front contacts 111, 112, and 113. Front contacts 114, 115 and 116 connect the channel wires C to code jumpers 117, 118, and 119 respectively to determine its station code to be transmitted. Front contact 120 of relay B–1LC connects a channel wire to contact 120a of a maintainer call relay B–1MCP of the code selecting relay bank associated with group B for selecting the maintainer call code to be transmitted. This relay B–1MCP is of the magnetic stick type, and it is actuated to its picked up or dropped away position in accordance with the respective push and pull operations of the maintainers call button MC (see Fig. 4A). Front contact 121 of relay B–1LC connects a code channel wire C to contact 122 of relay B–1SMP for the selection of a code character to be transmitted for controlling snow melters. This relay B–1SMP is of the magnetic stick type, and it is actuated to its picked up or dropped away position in accordance with the respective push and pull operations of the snow melter control button SM (see Fig. 4A).

The code characters selected are determined as being (+) or (−) during the respective steps of a communication cycle by reason of the condition of energization of the buses P and N which control relays PC and NC respectively (see Figs. 5B and 6). Thus if the relay PC is picked up during a step it causes the transmission of a (+) code character by the code communication apparatus during the next following step, and the relay NC is picked up during the step to cause the transmission of a (−) code character during the next following step.

Thus, a (+) or a (−) code character is transmitted for governing the position of the track switch B–1W (see Fig. 6) in accordance with the closure of front or back contact 123 of relay B–1CWP (see Fig. 5A).

An eastbound signal B–1RA or B–1RB is cleared or put to stop in accordance with the selective energization of a relay PC or NC in accordance with the closure of front or back contact 124 of relay B–1EGP. Similarly, a (+) or a (−) code character is selected for transmission for governing westbound signals B–1LA and B–1LB in accordance with the position of the contact 125 of relay B–1WGP.

At the end of the cycle of operation of the code communication apparatus, energy applied to the wire 101 (see Fig. 4E) for energizing the stick circuit of the relay LC that has been energized is momentarily interrupted by the relative conditions of the stepping relays 1V, 2V, 3V and 4V, and thus the relay LC that has been energized for the cycle is restored to its dropped away position. This of course conditions the circuits for the other relays LC so that another cycle of operation can be initiated in a manner comparable to that which has been described in detail for the transmission during a cycle of operation for the communication of switch and signal control codes to the track switch and signals of group B.

It is to be understood that the control circuits in the field for the track switches and signals are provided in a conventional manner so that each signal is restored to stop upon the acceptance of that signal by a train, thus requiring the transmission of another signal clearing code in order to clear the signal for a following train. A circuit illustrating this type of control is found in Fig. 2C, for example, in the above mentioned U.S. patent application of N. B. Coley, Ser. No. 563,637, filed February 6, 1956.

*Fleeting.*—Although it is generally desirable that manual operation by an operator be required to clear each manually controlled signal in order to be sure that he is aware of each train movement, there are certain conditions where there are following sections of trains, for example, where it is considered unnecessary to require an operator to manually designate the clearing of a signal for each of the trains. Thus a fleeting button FL (see Figs. 1 and 4A) is provided on the control panel P of the console type control machine in order that an operator may actuate this button together with the designation of a signal for which the fleeting control is to be provided, and thereby set up a condition wherein the code communication apparatus will be automatically set into a cycle of operation for the transmission of a signal clearing code for the associated signal for each train that approaches as long as the fleeting control is maintained effective. The fleeting control can be cancelled by the pulling out of the fleeting button FL at the same time that the signal control button is actuated for designation of the signal for which the fleeting control is to be cancelled.

In setting up a typical fleeting control for a signal, it will be assumed that it is desirable to clear the signal B–1RA of group B for governing eastbound traffic, and that such signal is to have fleeting control applied thereto. The mode of operation upon clearing this signal is the same as has been described except that upon actuation of the button 1–EGB for designating the clearing of this signal, the fleeting button FL is actuated at the same time. This provides for the energization of the fleeting relay FBP (Fig. 4A) through contact 126 of the fleeting button FL in its depressed position, and the picking up of this relay provides for the energization of the fleeting control relay B–1GPS (see Fig. 4C). This is a magnetic stick relay, and therefore the relay will be actuated to its picked up position and be maintained in that position until it becomes energized with the opposite polarity upon the manual designation of cancellation of the fleeting control. The circuit by which the relay B–1GPS is energized with a polarity to cause that relay to be picked up extends from (B+), including contact 74 of the signal control button 1EGB in its depressed position, asymmetric device 127, front contact 128 of relay FBP, wire 129, front contact 130 of relay B–LOP, front contact 131 of relay B–1EGP, back contact 132 of relay B–1WGP, front contact 133 of relay B–1CWP, winding of relay B–1GPS, wire 134, and back contact 135 of relay FFR, to (C).

Relay B–1GPS when picked up conditions a circuit for the relay B–1TXB by the closure of its front contact 136 so that as soon as a first train accepts the signal and enters the OS track section BT (see Fig. 6) the relay B–1TXB will become picked up to initiate the transmission of a signal clearing code to clear the signal B–1RA for the passage of a second train. Thus when a first train has accepted the signal B–1RA and entered the track section BT, an indication of the occupancy of this track section is communicated by the code communication apparatus to the control office, and upon the reception of this indication, the magnetic stick relay BTK is actuated to its picked up position. At this time the relay B–1TXB becomes picked up by the energization of its upper winding in a circuit extending from (+), including front contact 137 of the normal switch indicator relay B–1NK, front contact 136 of relay B–1GPS, front contact 138 of relay BTK, and upper winding of relay B–1TXB, to (—). Relay B–1TXB is a neutral slow drop-away relay, and thus a stick circuit is provided including front contacts 139 and 140 of relays B–LOP and B–1TXB to maintain this relay energized until a cycle of operation has been initiated for the transmission of a signal clearing code.

When the OS track section BT (see Fig. 6) becomes unoccupied by the train, an indication of this unoccupied condition of the track section BT is transmitted to the control office, and the reception of this indication causes the actuation of the track indication relay BTK (see Fig. 4C) to its dropped away position. The dropping away of this relay closes a start circuit for the picking up of relay B–1CH extending from (+), including front contact 137 of the normal switch indicator relay B–1NK, front contact 136 of relay B–1GPS, back contact 138 of relay BTK, front contact 141 of relay B–1TXB, back contact 142 of relay B–LOP, and upper winding of a relay B–1CH, to (—). The picking up of this relay closes a direct stick circuit through front contact 82 to maintain this relay energized until a cycle of operation is initiated. If a cycle is already in progress when relay B–1TXB is picked up, this relay is maintained energized in multiple with relay B–1LC through front contact 72 until it can initiate another cycle. The initiation of a cycle of operation in response to the picking up of relay B–1CH is effected in the same manner as has been heretofore described wherein the relay B–1LC becomes picked up, and the picking up of its dropped away position by tion of the relay B–1CH to its dropped away position by the energization of the lower winding of that relay with reverse polarity. Because of the relay B–1EGP being in its picked up position in accordance with the actuation of the button 1EGB, with the group B having first been designated, a signal clearing code is transmitted during the cycle of operation that has been automatically initiated as has been described so as to cause the clearing (subject to automatic track circuit control) of signal B–1RA (see Fig. 6), thus completing the control of signal B–1RA to a clear indicating condition automatically to clear a route for a following train in accordance with fleeting having been designated as has been described for that signal. If the signal cannot then be cleared because of track circuit occupancy by the first train, the signal control is stored by a relay similar to relay 10–14RGZ of Fig. 2 in the above mentioned application of N. B. Coley, Ser. No. 563,637, filed February 6, 1956.

Having thus described how fleeting is effective to set up a route for a first following train, it will be readily apparent that the same mode of operation becomes effective after passage of this train to set up for a second following train, and for as many trains as may follow prior to the designation by an operator of termination of the fleeting control for the associated signal.

When the operator wishes to terminate fleeting control for a signal, he first designates the group in which the signal is located and then he actuates the fleeting button to its pulled-out position and at the some time depresses the button having a number corresponding with the number of the signal in the designated group for which fleeting control is to be cancelled. This operation of the button energizes the fleeting control relay GPS for the designated group with a polarity to actuate the contacts of that relay to their dropped away positions and thus to prevent further picking up of the associated automatic start relay TXB.

Assuming that the removal of fleeting control is for the signal B–1RA (see Fig. 6) of group B, the pulling out of the button FL (see Fig. 4A) causes the picking up of the button repeater relay FFP, and the picking up of this relay applies energy to the relay B–1GPS with reverse polarity so as to cause the contacts of that relay to be actuated to their dropped away positions. The circuit by which relay B–1GPS is energized at this time extends from (B+), including contact 74 of button 1EGB in its depressed position (see Fig. 4A), isometric device 127, front contact 135 of relay FFP, wire 134, winding of relay B–1GPS, front contact 133 of relay B–1CWP, back contact 132 of relay B–1WGP, front contact 131 of relay B–1EGP, front contact 130 of relay B–LOP, wire 129, and back contact 128 of relay FBP, to (C). Relay B–1GPS when dropped away opens its front contact 136 and thus prevents the picking up of the relay B–1TXB upon passage of a train as is required for fleeting operation to become effective.

It will be noted that the circuits that have been described for fleeting operation have been selected through the track switch B–1W (see Fig. 6) in its normal position as is indicated by the relay B–1NK (see Fig. 4C) at the control office. This is because, according to this embodiment of the invention, fleeting is provided only for through moves on the main track and thus fleeting is not effective for the signal B–1RB (see Fig. 6), for example, for the movement of a train off of the passing siding 51. It is to be understood, however, that fleeting could be applied to this signal B–1RB if desired.

It should be readily apparent from the detailed description that has been set forth relative to the provision of fleeting for the control of a particular eastbound signal in group B, that a similar mode of operation is effective for the control of a westbound signal in this group in accordance with the operation of the button 1WGB (see Fig. 4A) at the same time that the fleeting button FL is actuated. It will also be readily apparent that fleeting is applied to east and westbound signals in other groups by a mode of operation and circuit structure similar to that which has been described in detail with reference to the provision of fleeting control relative to the control of a specific signal in group B.

Signal stop control

When a stop control is to be transmitted for a particular signal, the operator first designates the group by actuating the group button G in which the signal is located and then actuates the stop button SGB on the panel section having the same number as the number of the signal. Thus, for example, if it is the signal B–1RA (see Fig. 6) that is to be put to stop, the operator first actuates the group button GB for group B and then actuates the stop button 1SGB on panel section 1 because the signal to be put to stop is signal No. 1. If the signal were signal No. 2, the designation would be made by actuation of the signal stop button 2SGB on panel section PS2.

The actuation of the stop button 1SGB causes the energization of the signal control relay B–1EGB, that has been picked up, with reverse polarity so as to cause the contacts of this relay to be actuated to their dropped away positions. The circuit by which relay B–1EGB is energized at this time extends from (B—) including contact 143 of button 1SGB (see Fig. 4A), wire 144, front contact 145 of relay B–LOP, front contact 146 of relay B–1EGP, and winding of relay B–1EGP, to (C). The energization of relay B–1EGP with this polarity actuates the contacts of this relay to their dropped away positions and thus opens the circuit that has been described at front contact 146.

The operator next actuates the start button 1-SPB (see Fig. 4A) to initiate the code communication apparatus into a cycle of operation for the transmission of the stop control code for signal B-1RA (see Fig. 6) in accordance with the closure of back contact 124 of relay B-1EGP (see Fig. 5A) in the code selecting circuits. Thus, the signal stop control is transmitted to the field and the condition of the code selecting relay bank provided for group B is restored to its normal condition as illustrated in the drawings.

A signal code selecting relay EGP or WGP is automatically restored to its dropped away position upon the acceptance of an associated signal by a train. Thus, if the relay B-1EGP (see Fig. 4C), for example, has been picked up in connection with the clearing of an associated signal as has been described, the acceptance of that signal by a train causes a track indication to be transmitted to the control office which picks up relay BTK. The picking up of this relay closes a circuit to energize relay B-1EGP with reverse polarity so as to drive it to its dropped away position. This circuit extends for (B—) including limiting resistor 325, front contact 326 of relay B-1EGP, front contact 327 of relay BTK, back contact 328 of relay B-1GPS, front contact 329 of signal indication relay B-1EGK, and winding of relay B-1EGP, to (C).

*Group having plurality of switches*

The mode of operation heretofore described has been relative to the control of a single track switch and single set of signals constituting a typical group at a siding end.

Where there are more track switches and signals to be controlled in a group, as is the case for group C in this embodiment of the present invention, the No. 1 track switch and signals in that group are controlled in the same manner as has been described, and the same mode of operation also applies to the control of additional track switches and signals except that they are controlled from other similar panel sections and by similar buses and by similar banks of code selecting relays.

One thing different in the mode of operation, however, is that the track switch and signal designations are made on all of the panel sections involved before the actuation of a single start button to initiate the code communication apparatus into operation. If, however, it is known that certain of the track switches are in the positions required for the route that is to be established, it is unnecessary to actuate the buttons for these track switches on the different panel sections. This consideration of the mode of operation is of course also true for a group having a single switch such as the group B. Thus, if it is known that the last operated position of the track switch in group B was normal, and a normal position is required in setting up a subsequent route, it is unnecessary to operate a button 1NB on the panel section PS1 (see Fig. 4A) in setting up a route because the last designated position for this track switch has been stored by the condition of the magnetic stick relay C-1CWP (see Fig. 4D), which maintains its last operated position.

To consider more specifically the above described general mode of operation in setting up a route through a group having a plurality of track switches and signals, it will be assumed that an operator wishes to set up a route through group C from signal C-1RB (see Fig. 6) to signal C-2L over the crossover C-1W. In setting up a route through the group C, the operator first actuates the selector button GC for this group on the master panel and this actuation operates a group selector relay by the same mode of operation as has been heretofore described for group selection. Assuming that all of the track switches included in this route are required to be operated and thus must have their positions designated, the operator actuates the button 1RB (see Fig. 4A) on the panel section PS1 and the normal switch control button 2NB on the panel section PS2. This designation calls for the track switches of the crossover C-1W to be in their reverse positions and for the track switches of crossover C-2W to be in their normal positions. The signal governing entrance to the route is signal C-1RB, and thus because of this signal having the number "1," it is controlled by the panel section PS1, and to clear the signal for governing eastbound traffic, the operator actuates the button 1EGB to its depressed position. Having thus designated the required switch and signal controls for setting up the desired route, the operator then actuates the start button 1SPB to initiate the code communication apparatus into a cycle of operation for the transmission of switch and signal control codes that have been selected by the code selecting relay banks belonging to the respective panel sections PS1 and PS2.

It will be noted that a start button SPB is provided on each panel section PS and that the actuation of either of these start buttons SPB is effective to initiate a control cycle, but the start button must be actuated on the panel section belonging to the signal designation button that is actuated. This is because each signal is controlled from a cycle having a distinctive station code, while switch controls for all of the track switches in the group C are transmitted for any cycle, irrespective of station code.

To consider more specifically some of the circuits involved, the designation of the group C by the actuation of the button GC (see Fig. 4A) causes the picking up of the group selector relay C-LOP (see Fig. 4D). The circuit by which relay C-LOP is picked up extends from (+), including back contact 60 of relay LOS (see Fig. 4B), normally closed contact 61 of the group selector button GA, wire 62, normally closed contact 63 of the group selector button GB, wire 147, contact 148 of button GC in its depressed position, winding of relay C-LOP, back contact 149 of relay C-1CH, cancel bus wire 65, and normally closed contact 66 of the location cancel button LOC, to (—). This relay in picking up causes the picking up of the group repeater relay C-LOPP (see Fig. 4E) by the energization of an obvious circuit closed at front contact 150 of relay C-LOP. Relays C-LOP and C-LOPP are maintained picked up in accordance with the closure of the stick contact 151 of relay C-LOP until the start storage relay C-1CH has become picked up.

With the group selector relays LOP and LOPP in their picked up positions, the magnetic stick code selecting relays are conditioned by the actuation of the buttons on the respective panel sections PS1 and PS2. Inasmuch as the code selecting relay organization associated with these respective panels as illustrated in Figs. 4D and 4E respectively is the same as that which has been described in detail with respect to the code selecting relays associated with group B and shown in Fig. 4C, reference can be made to this prior description for details of the mode of operation which also applies to the circuits shown for the magnetic stick code selecting relays in Figs. 4D and 4E. The magnetic stick relays in Fig. 4D that are conditioned in response to the actuation of control designating means on the panel section PS1 are energized through front contacts 156, 157, 158, 159, 160, 161, 162, 163, 164, 165 and 166 of group selector relay C-LOP. Similarly in Fig. 4E, the magnetic stick code selecting relays which are governed by the same mode of operation as the relays shown in Fig. 4C, but from the panel section PS2 and from a different set of control buses, are controlled through front contacts 167, 168, 169, 170, 171, 172, 173, 174 and 175 of relay C-LOPP.

Upon actuation of the start button 1SPB (see Fig. 4A) on panel section PS1, energy is applied to the bus wire 80 and through front contact 152 of relay C-LOP (see Fig. 4D) to the upper winding of relay C-1CH. This relay when picked up is maintained energized by a direct stick circuit closed at front contact 153 of relay C–1CH to maintain this relay energized until the picking up of relay C–1LC and the energization of the lower winding of relay C–1CH with reverse polarity.

The picking up of relay C–1CH causes the dropping away of the group selector relay C–LOP by the opening of its circuit at back contact 149. The dropping away of relay C–LOP causes the dropping away of its repeater relay C–LOPP by the opening of front contact 150.

Assuming that the code communication apparatus is at rest at the time when the relay C–1CH becomes picked up, the relay C–1LC is in turn picked up by the energization of a circuit extending from (+) including back contacts 83, 84, 85, 86, and 87 of relays 1V, 2V, 3V, 4V, and LCPP respectively, front contact 88 of relay LCP, back contact 89 of relay C–2CH, wire 90, front contact 91 of relay C–1CH, back contact 154 of relay C–LOP, back contact 155 of relay C–1TXB, and upper winding of relay C–1LC, to (−).

The station code selected for transmission is that belonging to the No. 1 signal at station C because of the energization of relay C–1LC as has been described. With reference to Fig. 5B, the control code is selected in accordance with the condition of respective code selecting relays through contacts 176, 177, 178, 179, 180 and 181 of relays C–1LC. The station selecting portion of the code is governed by circuits extending through front contacts 182, 183 and 184 of relay C–1LC, the characters selected for transmission being in accordance with the positions of the respective code jumpers 185, 186 and 187.

During the transmission of the cycle, the control code for the crossover C–1W (see Fig. 6) is determined by the contact 188 of the code selecting relay C–1CWP, and the code for the control of the crossover C–2W is in accordance with the contact 189 of relay C–2CWP. If the signal to be cleared for the route is a signal C–1 for eastbound traffic, the relay C–1EGP will have been picked up in accordance with such signal designation and the closure of its front contact 190 selects the control code for the clearing of the eastbound signal. Similarly, if the designation has been for the clearing of a westbound signal C–1, the signal clearing code is selected by the closure of front contact 191 of relay C–1WGP. The transmission of the switch and signal control codes selected by the above described circuits causes the operation of the associated track switches and signals in the field by a code communication apparatus according to usual practice as is indicated by block diagram in Fig. 6.

If it is assumed that a route to be set up through the group C is for the clearing of a signal C–2 for either eastbound or westbound traffic, the start button 2SPB (see Fig. 4A) on the panel section PS2 is actuated as has been described above, rather than the start button 1SPB, and thus the relay C–2LC (see Fig. 4E) becomes picked up rather than the relay C–1LC as has been assumed under the above described conditions. Because of the relay C–2LC being in its picked up position rather than the relay C–1LC, a different station code is selected for transmission through the front contacts 192, 193 and 194 of relay C–2LC and the respective code jumpers 185, 196 and 197 (see Fig. 5B).

Switch codes for both of the crossovers are transmitted in accordance with circuits extending through front contacts 198 and 199 of relay C–2LC to the contacts 188 and 189 of relays C–1CWP and C–2CWP respectively. The signal codes are selected by the contacts 200 and 201 of relay C–2EGP and C–2WGP which are connected respectively to front contacts 202 and 203 of relay C–2LC. It will be readily understood that the signal codes selected by these relays C–2EGP and C–2WGP are similar to the codes selected by similar relays provided for the signal C–1, but the codes are identified as being for the signal C–2 in accordance with the distinctive station code that has been selected for transmission through the jumpers 195, 196 and 197.

*Blocking*

When it is desired to block a track switch so that it cannot be operated, even though a switch control may be inadvertently designated, the operator designates such blocking control by first actuating a group button for the particular group involved and then by pulling out the reverse switch control designating button on the particular panel section PS belonging to the track switch for which he wishes blocking to be established.

More specifically, if the operator wishes to set up blocking for the track switch B–1W (see Fig. 6), he actuates the group designating button GB (see Fig. 4A), and because the track switch B–1W is controlled by panel section PS1, he actuates the button 1RB to its pulled out position momentarily from which it is automatically restored to its normal position. This actuation energizes relay B–1BWP (see Fig. 4C) by a circuit extending from (B+) including contact 69 of button 1RB in its pulled out position, (see Fig. 4A), wire 205, front contact 206 of relay B–LOP and winding of relay B–1BWP, to (C). The picking up of this relay opens the circuit for the relay B–1CWP at back contact 73 to prevent any further operation of the track switch B–1W until cancellation of the blocking control that has been designated. This is true because the relay B–1BWP is of the magnetic stick type and thus will be maintained picked up until the blocking control is cancelled.

Cancellation of the blocking control can be effected by first designating the group for which the blocking control is to be removed, and then pulling out the normal switch control button NB on the panel section PS corresponding to the track switch involved. Thus, for cancelling the blocking that has been provided for the track switch B–1W, after actuation of the group button GB, the button 1NB on the panel section PS1 is pulled out (see Fig. 4A) and the pulling out of this button applies energy at contact 204 of button 1NB to the circuit that has just been described for the energization of the relay B–1BWP (see Fig. 4C). Energization is, however, of reverse polarity so as to drive the relay B–1BWP to its dropped away position and thus close its back contact 73 in the circuit for control of relay B–1CWP so as to render that relay again subject to control by manual designation of the desired positions for the track switch B–1W. Having thus described specifically the mode of operation involved in applying blocking control to a particular track switch, it is to be understood that a similar mode of operation is effective in applying blocking to the other track switches in the system.

By a similar mode of operation blocking can be applied for a signal by the pulling out of the signal control button EGB or WGB for the signal involved. To consider a typical blocking apparatus, it will be assumed that an operator desires to block the clearing of an eastbound signal B–1RB or B–1RA in group B (see Fig. 6). The operator first designates the group B by actuation of the group button GB (see Fig. 4A), and then he actuates the button 1EGB for the signal involved on the panel section PS1 to its pulled out position. The pulling out of this button applies energy to the signal blocking relay B–1EBP (see Fig. 4C). The circuit for the energization of relay B–1EBP extends from (B+), including contact 208 of button 1EGB in its pulled out position, wire 209, the front contact 210 of relay B–LOP and the winding of relay B–1EBP, to (C). This relay when picked up opens the control circuit for the signal clearing relay B–1EGP at back contact 77 and thus prevents the further clearing of the signals controlled by relay B–1EGP. It will be noted that there are separate relays provided for blocking for opposing signals so that blocking can be made effective for one direction of traffic and not the other. In other words, the provision of blocking as has heretofore been described for the signals B–1RA and B–1RB does not prevent the clearing of signals B–1LA and B-1LB for governing the opposite direction of traffic. If it is desired to block the westbound signals B-1LA and B-1LB, it is necessary to designate a separate blocking control by a mode of operation similar to that which has been described but associated with the westbound signals whereby the blocking relay B-1WBP (see Fig. 4C) becomes picked up because this is the blocking relay that is associated with westbound traffic and such signals.

To cancel a blocking designation for a signal, the operator first actuates the group button for the particular group involved and then pulls the stop button SGB on the panel section PS belonging to the signal involved in the group selector. Thus, to cancel the blocking which has been applied for the signals B-1RA and B-1RB, the operator actuates the group selector button GB (see Fig. 4A) and then pulls the signal stop button 1SGB on panel section PS1. As a result of this operation, the closure of contact 143 of button 1SGB in its pulled out position applies energy to wire 211 and through front contacts 212 and 213 of relays B-LOP and B-1EBP respectively to energize the relay B-1EBP with reverse polarity so as to drive this relay to its dropped away position. Because of relay B-1EBP being of the magnetic stick type, it is driven to its dropped away position before its restoration circuit is opened at its own front contact 213.

Having thus described specifically the circuits involved in the provision of a blocking for certain of the signals, it is to be understood that this mode of operation is typical of that provided in the system for the other signals.

*Neutral code selecting relays*

Because of the above described code selecting relays of the respective code selecting relay banks being of the magnetic stick type, these relays maintain their last actuated positions without requiring stick circuit control. If it is desirable, however, to use neutral relays for the same general purposes, a similar mode of operation can be accomplished by maintaining the relays in their actuated positions by stick circuits. Circuits showing how this can be accomplished are shown in Figs. 7A and 7B for a typical group A, and it is to be understood that similar circuits can be provided for the other groups as required. These neutral relays are made slightly slow in dropping away to cover the crossover time of the contacts of the associated group relay LOP in shifting from one circuit to another.

For consideration of the mode of operation and the circuits involved in the provision of stick circuits for the neutral relays, it will be assumed that group A is designated so as to pick up the relay A-LOP (see Fig. 7B). The circuits are not shown in Fig. 7B for the control of relay A-LOP as it is assumed that this relay is controlled in the same manner as has been heretofore described for a corresponding relay B-LOP which is associated with group B. After the picking up of the group selector relay A-LOP, relay A-1WN is picked up if the normal switch control pushbutton 1NB on the first control panel section is actuated to its depressed position. The circuit by which relay A-1WN is picked up extends from (+), including contact 214 of button 1NB in its depressed position, wire 215, front contact 216 of relay A-LOP, back contact 217 of switch blocking relay A-1BWP1, winding of relay A-1WN and back contact 218 of relay A-1WR, to (—). This circuit is maintained energized after the restoration of the pushbutton 1NB to its normal position by a circuit extending from (+), including contact 222 of button 1RB in its normal position, wire 219, front contact 220 of relay A-LOP, front contact 221 of relay A-1WN, winding of relay A-1WN, and back contact 218 of relay A-1WR, to (—). After the start button has been actuated, relay A-LOP becomes dropped away according to a mode of operation which has been described relative to the control of relay B-LOP, and the dropping away of that relay closes a stick circuit to maintain the relay A-1WN energized until further designation of group A by the group selecting means. This stick circuit extends from (+), including back contact 220 of relay A-LOP, front contact 221 of relay A-1WN, winding of relay A-1WN and back contact 218 of relay A-1WR, to (—). It will be seen from this combination of stick circuits that relay A-1WN is maintained picked up until the designation of a reverse switch control by the actuation of the master switch control button 1RB with the relay A-LOP in its picked up position.

It is further provided that the switch control relay A-1WN is maintained picked up by obvious stick circuits closed at front contacts 223 and 224 respectively of relays A-1GPS1 and A-1BWP1. Thus the energization of the relay A-1GPS1 in accordance with the designation of a fleeting control insures that relay A-1WN is maintained energized, and the same is true if a blocking control is designated so as to pick up the blocking relay A-1BWP1.

A similar mode of operation is effective in the control of the reverse switch control relay A-1WR in that this relay is picked up in response to the actuation of the reverse switch control designation button 1RB (see Fig. 7A) at a time when group A is selected so that the relay A-LOP is in its picked up position. The actuation of this button causes the dropping away of the normal relay A-1WN because of the opening of its stick circuit at normally closed contact 222 of button 1RB. The circuit by which the relay A-1WR is picked up extends from (+) including contact 222 of relay 1RB (see Fig. 7A) in its depressed position, wire 225, front contact 226 of relay A-LOP, back contact 227 of relay A-1BWP1, winding of relay A-1WR and back contact 228 of relay A-1WN, to (—). The picking up of this relay establishes a stick circuit extending from (+) including normally closed contact 214 of button 1NB, wire 229, front contact 230 of relay A-LOP, front contact 231 of relay A-1WR, winding of relay A-1WR and back contact 228 of relay A-1WN, to (—). The dropping away of the group relay A-LOP upon transmission of the controls closes a stick circuit at back contact 230 to maintain the relay A-1WR in its picked up position. Front contact 233 of relay A-1BWP1 maintains stick energy on the relay A-1WR blocking is effective for the associated track switch.

Upon designation of a control for clearing an eastbound signal by the actuation of a button 1EGB (see Fig. 7A) after selection of group A by the picking up of relay A-LOP (see Fig. 7B), the relay A-1EGP1 becomes picked up for the selection of a signal clearing code for an eastbound signal. The circuit by which relay A-1EGP1 becomes picked up extends from (+), including contact 234 of button 1EGB in its depressed position, asymmetric device 235, wire 236, front contact 237 of relay A-LOP, winding of relay A-1EGP1, front contact 238 of relay A-1WN, back contact 239 of the track blocking relay A-BTB and back contact 240 of the relay A-1WGP1, to (—). If the track switch in group A is called for to be operated to its reverse position and the relay A-1WN is in its dropped away position, the back contact 238 shunts back contact 239 of the blocking relay A-BTB out of the circuit just described, as track blocking has been provided for only the main track in this embodiment of the present invention.

The signal control relay A-1EGP1 is maintained picked up by a stick circuit until the acceptance of the associated signal by a train or until manual designation to put the signal to stop by the actuation of the stop button 1SGB (see Fig. 7A). Thus relay A-1EGP1 is maintained energized by a stick circuit extending from (+), including normally closed contact 241 of the stop button 1SGB, wire 242, front contact 243 of relay A-LOP, back contact 244 of relay A-1WGK, back contact 245 of relay A-1EGK, front contact 246 of relay A-1EGP1, winding of relay A-1EGP1, front contact 238 of relay A-1WN, back contact 239 of relay A-BTB and back contact 240 of relay A–1WGP1, to (—). It will be noted that the back contacts 244 and 245 of the west-bound and east-bound signal indication relays A–1WGK and A–1EGK respectively are shunted when the detector track section is unoccupied by the back contact 247 of the track indication relay A–1TK. This arrangement of contacts of the track and signal indication relays in the stick circuit for relay A–1EGP1 provides for the slotting of this relay upon the acceptance of the associated signal in the field upon passage of a train on receipt in the control office of pertinent indications. As the provision of fleeting is effectively a nonstick control for the signal, the slotting circuit organization just described is shunted in the stick circuit for the relay A–1EGP1 when fleeting is effective by front contact 248 of relay A–1GPS1. Energy is applied to the stick circuit that has been described through back contact 243 of relay A–LOP upon the dropping away of this relay when the signal controls are transmitted. Upon the clearing of the signal that is governed by the signal control relay A–1EGP1, the signal indication relay A–1EGK is actuated to its picked up position upon receiving the signal clear indication via code communication from the field, and the picking up of this relay closes the circuit at front contact 249 to shunt the contacts 238 and 239 checking the blocking out of the circuits just described. The reason for this is to permit track blocking to be instituted behind a train that has been cleared into a section.

To consider the mode of operation in the clearing of a westbound signal, it will be assumed that the relay A–1EGP1 is in its dropped away position and group A has been selected. If there has been designation of the clearing of a westbound signal by the depression of the button 1WGB (see Fig. 7A) after the group selected has been effective to pick up the relay A–LOP, the relay A–1WGP1 becomes picked up by the energization of a circuit extending from (+) including contact 250 of button 1WGB in its depressed position, asymmetric device 251, wire 252, front contact 253, of relay A–LOP, winding of relay A–1WGP1, back contact 254 of relay A–1EGP1 and back contact 255 of the blocking relay ATB to (—). When this relay is picked up, it is maintained energized through front contact 256 of relay A–1WGP1 and stick circuit that selections have been described above when assuming conditions involving the energization of relay A–1EGP1. After receiving an indication from the field that the westbound signal has been cleared, the picking up of the signal indication relay A–1WGK closes front contact 257 to shunt back contact 255 out of the stick circuit just described.

The general mode of operation for automatically setting the system into operation for clearing signals in accordance with fleeting control when using the neutral code selecting relays shown in Figs. 7A and 7B is similar to that which has been described. The system therein disclosed, however, requires a slightly different manipulation in designation of the fleeting controls than has been described in that fleeting designation is made by the simultaneous actuation of the master fleeting button FB (see Fig. 7A) in combination with the actuation of the button for designation of a signal in a designated group for which the fleeting is to be provided. This designation of fleeting is by the actuation of the buttons involved to their depressed positions contemporaneously, and for designation of the cancellation of fleeting for a signal, the fleeting button FB is pulled out from its normal position and contemporaneously a button is depressed for the signal for which fleeting control is to be cancelled in a selected group.

Figure 4C:
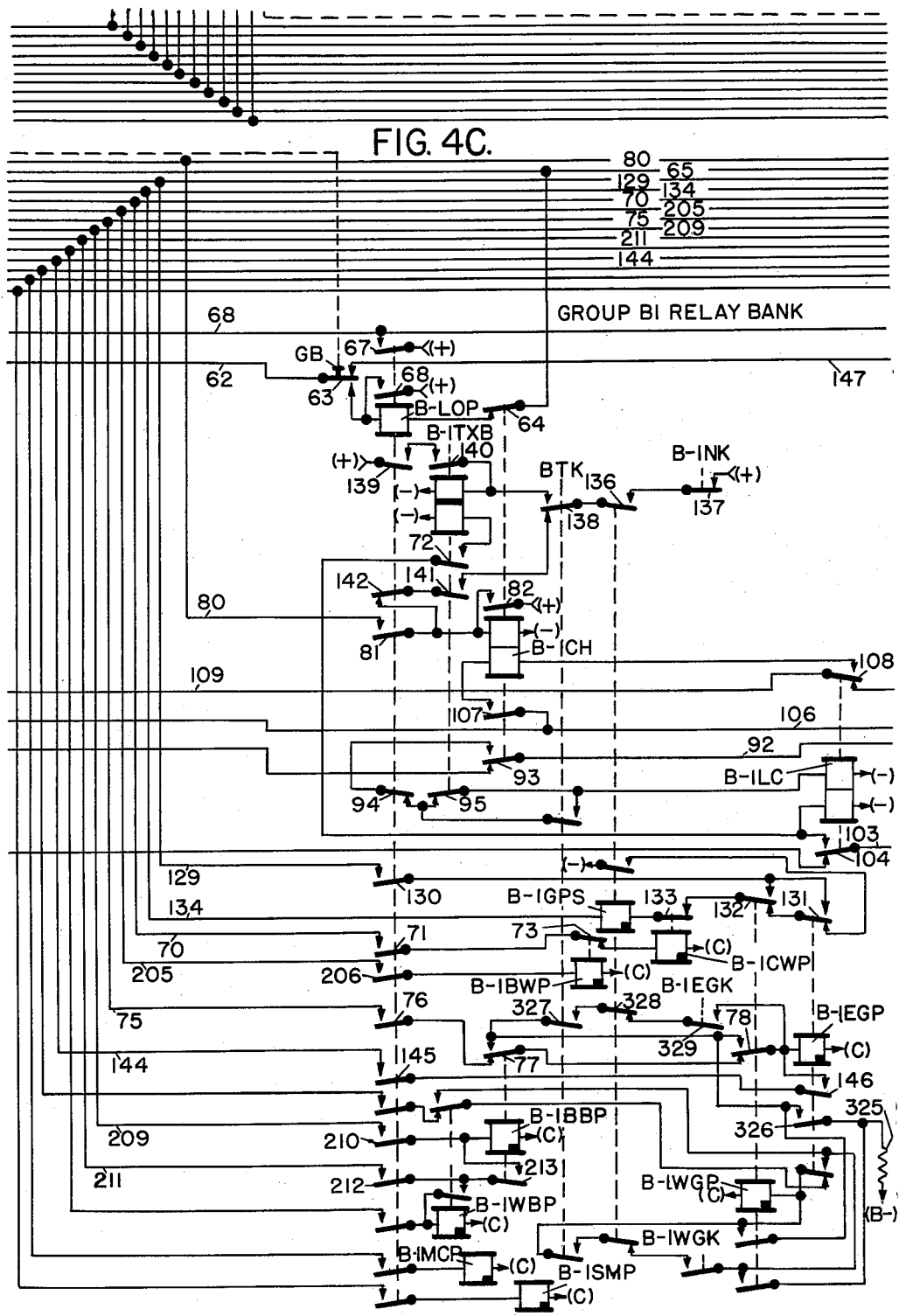

With reference to Fig. 7B, the relay A–1GPS1 is a fleeting control relay comparable to the magnetic stick relay A–1GPS of Fig. 4B, and it is to be understood that the relay A–1GPS1 of Fig. 7B is operable to initiate a cycle in the same manner as has been described in detail relative to the initiation of a cycle by the relay B–1GPS of Fig. 4C.

Assuming group A has been selected and the relay A–LOP has become picked up, the designation of a fleeting control by the joint actuation of the buttons FB and 1EGB (see Fig. 7A) to their depressed positions, causes the picking up of the relay A–1GPS1 (see Fig. 7B) by the energization of a circuit extending from (+), including contact 234 of button 1EGB (see Fig. 7A) in its depressed position, asymmetric device 258, back contact 259 of relay UFP, front contact 260 of relay FP, wire 261, front contact 262 of relay A–LOP, winding of relay A–1GPS1, front contact 263 of relay A–1EGP1, and front contact 264 of relay A–1WN, to (—). The front contact 260 (see Fig. 7A) of relay FP is closed in this circuit because of the relay FP being energized by an obvious circuit closed at contact 265 of button FB in its depressed position. If no prior designation has been made for the clearing of a signal controlled by relay A–1EGP1, the actuation of the associated signal control button when designating fleeting causes a control to be sent out to clear the signal.

Relay A–1GPS1 when picked up is maintained energized by a stick circuit extending from (+), including back contact 266 of relay GF (see Fig. 7A), wire 267, front contact 268 of relay A–LOP, front contact 269 of relay A–1GPS1, winding of relay A–1GPS1, front contact 263 of relay A–1EGP1, and front contact 264 of relay A–1WN, to (—). After transmission of the control that has been designated, the group selector relay A–LOP becomes dropped away, and the dropping away of this relay closes an auxiliary stick circuit to maintain the relay A–1GPS1 energized until group A is again designated. This stick circuit extends from (+), including back contact 268 of relay A–LOP, front contact 269 of relay A–1GPS1, winding of relay A–1GPS1, front contact 263 of relay A–1EGP1, and front contact 264 of relay A–1WN, to (—).

When it is desired to cancel a fleeting control for a signal (when using a neutral relay A–1GPS1 as is illustrated in Fig. 7B) the operator pulls out the button FB and causes the picking up of relay UFP (see Fig. 7A), and at the same time actuates the button for the signal involved to its depressed position. This mode of operation causes the picking up of the relay GF which opens a stick circuit that has been described for the relay A–1GPS1 at back contact 266 on relay GF. Relay GF is picked up under these conditions by the energization of a circuit extending from (+), including contact 234 of button 1EGB in its depressed position, asymmetric device 258, front contact 259 of relay UFP, and winding of relay GF, to (—). Because of this designation of cancellation of a fleeting control being made after designation of group A as the group involved, the group relay A–LOP is in its picked up position at this time, and thus the stick circuit for the control of relay A–1GPS1 including back contact 268 of relay A–LOP is open. Therefore, the relay A–1GPS1 becomes dropped away to terminate the fleeting condition that has been set up.

In the circuit organization illustrated in Figs. 7A and 7B, joint operation of two buttons is required for the designation of blocking controls, there being a master blocking button BPB (see Fig. 7A) which is depressed contemporaneously with the depression of a switch control designating button or a signal control designating button for the track switch or signal with which blocking is to be associated. The switch and signal control buttons, however, are actuated to their pulled out positions for blocking designation as compared to their being actuated to depressed positions for designation of signal clearing controls and fleeting controls.

In considering more specifically the organization shown in Figs. 7A and 7B for switch blocking, the relay A–1BWP1 is provided for this purpose, and as has been described, the picking up of this relay establishes a stick circuit for whichever switch control relay WN or WR is in its picked up position to maintain such switch control relay picked up, irrespective of attempts to designate a different control for that track switch. Therefore, in setting up a switch blocking control, it is first necessary to select the group by actuation of a group button G and then to designate the desired normal or reverse position in which a switch is to be blocked, if this position is to be different from the last operated position of the track switch. It has been assumed that the last operated position of the track switch governed by the switch control relays of Fig. 7B was in its normal position, and thus the normal switch code selecting relay A-1WN is shown as being normally in its picked up position. If no reverse control is designated by the operator prior to the picking up of the blocking relay A-1BWP1 the track switch will be blocked in its normal position by reason of application of stick energy to the relay A-1WN through front contact 224 of relay A-1BWP1.

The circuit by which relay A-1BWP1 is energized is closed with button 1NB in its pulled out position and button BPB in its depressed position and extends from (+), including contact 214 of button 1NB in its pulled out position, back contact 270 of relay UBP, front contact 271 of relay BP, wire 272, front contact 273 of relay A-LOP, and winding of relay A-1BWP1, to (−). A stick circuit is established for this relay extending from (+), including back contact 274 of relay WB (see Fig. 7A), wire 275, front contact 276 of relay A-LOP, front contact 277 of relay A-1BWP1, and winding of relay A-1BWP1, to (−). After the group selector relay A-LOP is dropped away, the relay A-1BWP1 is maintained picked up by stick circuit energy applied at back contact 276 of relay A-LOP. Because of the normal switch control code selecting relay A-1WN being maintained picked by the stick circuit closed by the blocking relay A-1BWP1, it is impossible to pick up the reverse switch control code selecting relay A-1WR because of the back contact 228 of relay A-1WN in the pick up circuit for the reverse switch code selecting relay.

The mode of operation for cancelling the switch blocking control is to pull out both the master blocking button BPB and the switch control button for either the normal or reverse position of the track switch involved (after group designation has been made). The pulling out of the master blocking button BPB closes contact 278 of that button in its pulled out position and picks up the relay UBP and the picking up of this relay, by the closure of its front contact 270, provides an obvious circuit by which the relay WB is picked up in accordance with the closure of either contact 214 or contact 222 of buttons 1NB and 1RB respectively in its pulled out position. The picking up of relay WB opens the stick circuit that has been described for the relay A-1BWP1 at back contact 274 and thus causes the dropping away of the blocking relay A-1BWP1.

Blocking in connection with the signals as provided in the circuits shown in Figs. 7A and 7B is somewhat different than that blocking provided for the signals where magnetic stick relays have been used in that the blocking is made to be effective more particularly for stretches of track rather than for particular signals that are involved. Thus, the blocking relay ATB (see Fig. 7B) is provided for blocking movement into the approach track section AT (see Fig. 6) and the relay A-BTB is provided for blocking movement into the track section A-BT. Thus, this relay can be picked up in accordance with blocking designation for group A or group B for movements into the track section A-BT.

To consider first the control of the blocking relay ATB, the general mode of operation in manipulation of the blocking buttons is similar to that which has been described specifically for establishing switch blocking in that the group selection is made first and then the master blocking button BPB is depressed together with the actuation of the button 1EGB for the signal adjoining the stretch of track AT for which the blocking is to be provided. The actuation of this button is to its pulled out position, and in this position the relay ATB is picked up for the energization of a circuit extending from (+), including contact 234 of button 1EGB in its pulled out position, back contact 279 of relay UBP, front contact 280 of relay BP, wire 281, front contact 282 of relay A-LOP, and winding of relay ATB, to (−). This relay when picked up is maintained energized by a stick circuit extending from (+), including back contact 283 of relay UBP, wire 284, front contact 285 of relay A-LOP, front contact 286 of relay ATB and winding of relay ATB, to (−). Another stick circuit is closed upon the dropping away of the group relay A-LOP through back contact 285 of relay A-LOP to maintain the relay ATB picked up while controls are designated for other groups. Relay ATB in its picked up position opens the circuit for the relay A-1WGP1 at back contact 255 so as to prevent the picking up of this relay for the transmission of a signal clearing code for governing traffic into the stretch of track AT for which the blocking is provided. The connection of front contact 257 of the signal indication relay A-1WGK in multiple with front contact 255 of relay ATB insures that a signal that is already cleared for entrance into the stretch of track AT is not put to stop by the blocking designation but that the blocking designation will be effective to prevent the further clearing of a westbound signal governing traffic into the section AT.

To cancel the track blocking that has been described as being set up by the picking up of relay ATB, the operator pulls out the master blocking button BPB after having designated group A, and at the same time pulls out the button 1EGB (see Fig. 7A). This opens the stick circuit that has been described for the relay ATB at back contact 283 of relay UBP, and the stick circuit including back contact 285 of the group relay A-LOP (see Fig. 7B) is open at this time so that the blocking relay ATB is dropped away to cancel the blocking that has been set up.

A similar mode of operation is provided for blocking movement into the track section A-BT (see Fig. 6) between the groups A and B, except that the blocking relay A-BTB (see Fig. 7B) is subject to control when either group A or group B has been designated. If group A has been designated, the circuit by which relay A-BTB becomes picked up extends from (+), including contact 250 of button 1WGB in its pulled out position (see Fig. 7A), back contact 287 of relay UBP, front contact 288 of relay BP, wire 289, front contact 290 of relay A-LOP, and winding of relay A-BTB, to (−). The stick circuit by which relay A-BTB is maintained picked up extends from (+), including back contact 291 of relay UBP connected in multiple with normally closed contact 250 of button 1WGB, wire 292, front contact 293 of relay A-LOP, back contact 294 of relay B-LOP, front contact 295 of relay A-BTB, and winding or relay A-BTB, to (−). The relay A-BTB is subject to similar controls through contacts 296 and 294 of relay B-LOP when group B is designated rather than group A.

*Indications*

Different types of indications may be provided on the track diagram and on the master panel in accordance with the requirements of practice, such, for example, as the typical indication circuits shown in Fig. 8. The indication circuits shown in Fig. 8 relate more particularly to means for indicating the selection of the several groups to be subject to control by the master panel, together with signal, fleeting and blocking indications.

Each group designation is indicated at three different points by the energization of respective indicator lamps, one of which is on the track diagram panel 52, another of which is in the group track diagram indicator TGK, and the other of which is on the traffic master control panel P. When group B is designated as has been described, the group selector relay B-LOP is picked up, and the closure of front contact 297 of this relay energizes lamp BGE1 on the track diagram 52, lamp BGE2 in the group track diagram indicator B–TGK, and lamp BGE3 on the traffic master control panel P (see Fig. 1). It will be noted that there are separate group lamps for the several diagrams in the track indicator TGK, the track diagram corresponding to each group being impressed in a separate sheet of translucent material, and the lamp associated with each sheet of translucent material being adjacent an edge thereof so as to illuminate that sheet by edge illumination and thus illuminate the track diagram so that the track diagram is clearly visible when the group indicator lamp for that sheet is illuminated, even though the plastic sheets be stacked one on top the other in the indicator TGK.

Each of the signals has two indicator lamps associated therewith, one of which lamps is disposed in the signal symbol on the track diagram and is preferably green, and the other of which lamps is disposed adjoining the base of the signal symbol and is preferably red. The lamp in the symbol is used more particularly to indicate the clear or stop condition of the signal, and the adjoining lamp is used more particularly to indicate as to whether either fleeting or blocking has been applied to the associated signal.

If the clearing of an eastbound signal in group B is designated, for example, the signal code selector relay B–1EGP1 is picked up in a manner comparable to that which has been described for the energization of relay A–1EGP1 of Fig. 7B, and the picking up of this relay causes the flashing of the indicator lamp in the symbol of an eastbound signal in group B as selected by the called for position of the track switch in that group. Thus, if the track switch in group B is called for to be in its normal position, the relay B–1WN is in its picked up position, and the lamp EAGE is energized with flashing energy by a circuit extending from (F+), including front contact 298 of relay B–1EGP1, back contact 299 of relay B–1EGK, front contact 300 of relay B–1WN, and lamp EAGE, to (—). Had the track switch been called for to be operated to its reverse position, the lamp EBGE for the other eastbound signal of group B would have been energized by flashing energy through front contact 301 of relay B–1WR, and the lamp EAGE would have remained dark because of its circuit being open at front contact 300 of relay B–1WN. Upon the clearing of the signal in group B, an indication is transmitted to the control office causing the picking up of the magnetic stick signal indication relay B–1EGK, and the picking up of this relay opens the circuit just described for the energization of the lamp EAGE with flashing energy and closes a circuit to energize the lamp with steady energy. The circuit for energization of lamp EAGE with steady energy extends from (+), including front contact 302 of relay B–1EGK, front contact 303 of relay B–1NK, back contact 304 of relay B–1RK, and lamp EAGE, to (—). If the track switch of group B had been called for to be in its reverse position, the lamp EBGE would have become energized with steady energy upon the reception of the signal indication by a circuit extending from (+), including front contact 302 of relay B–1EGK, back contact 303 of relay B–1NK, front contact 305 of relay B–1RK, and lamp EBGE, to (—).

If a signal is designated by the operator to be put to stop, the lamp at the base of the signal symbol is flashed. Thus, for example, if the signal for governing eastbound traffic on the main track in group B is to be put to stop by an operator, the lamp EARE is energized with flashing energy until an indication is received that the signal has actually been operated to its stop indicating position. The circuit by which the lamp EARE is energized at this time extends from (F+), including, back contact 298 of B–1EGP1, back contact 306 of relay B–1TK, back contact 307 of relay B–1RK, front contact 308 of relay B–1NK, front contact 309 of relay B–1EGK, and lamp EARE, to (—).

When fleeting control is designated for a signal, the indicator lamp located at the base of the symbol of the signal on the track diagram is steadily energized. Thus, if fleeting is designated for the eastbound signal on the main track of group B, the lamp EARE becomes steadily energized by a circuit extending from (+), including front contact 310 of relay B–1GPS1, front contact 311 of relay B–1EGP1 and lamp EARE, to (—). Because of the designation of the fleeting control, the indicator lamp in the symbol for the associated signal is also energized because of the signal being clear, and thus it is the combination of both indicator lamps associated with the signal being energized that is indicative of a fleeting control having been designated for the associated signal.

If a blocking control has been designated for a stretch of track associated with a signal, the indicator lamp at the base of the signal symbol is illuminated steadily to designate that blocking is effective, but the indicator lamp in the signal symbol remains dark because that signal cannot be cleared. Thus, if the relay A–BTB has been picked up to provide blocking for the section of the main track between the group A and B, the lamp EARE becomes steadily energized to indicate that blocking is effective by the energization of a circuit extending from (+) including back contact 312 of relay B–1EGP1, front contact 313 of the blocking relay A–BTB, front contact 314 of relay B–1RK and lamp EARE, to (—).

Having thus described typical indication circuits for a particular signal for governing eastbound traffic, it is to be understood that a similar circuit organization is provided for other eastbound signals and for signals for governing the opposite direction of traffic.

Switch and signal grouping

Having described the mode of operation of the system for one particular grouping of the track switches and signals, it is to be understood that this grouping is arbitrary and that other groupings for the same track layout can be made in accordance with the requirements of practice. One example of a different grouping for the track switches and signals associated with passing sidings is shown in the block diagram of Fig. 9. The system illustrated in Fig. 9 treats each passing siding as a single group, as compared to the two groups A and B being required for a single passing siding as in the system according to the block diagram of Fig. 2.

In the system according to Fig. 9 where the track switches and signals at both ends of a passing siding are in a single group, the track switch and signals at one end of a siding are governed by panel section PS1 when the group is selected, and the track switch and signals at the other end of the siding are governed by the panel section PS2 when the same group is selected.

The circuit organization of the system according to the block diagram of Fig. 9 is comparable to that which has been described in detail with the exception that each group will have two stations (one station for each separately controlled signal in the group) and each station within the group is governed by a different panel section PS. To follow the same mode of operation that has been described, the operator would designate the clearing of only one signal for a selected group at one time, and he would actuate the start button on the particular panel section belonging to the signal having its control designated. It is possible, however, by reason of the storage system provided in the organization of the change relays CH to designate the controls for the signals at both ends of a passing siding within a single group at one time.

With the circuits that have been described, such designation would require the actuation of the start buttons on the panel sections PS belonging to the signals having their controls designated simultaneously in order that the relays CH belonging to the several panel sections PS could all be picked up before the automatic cancellation of the group designation which becomes effective immediately following the start designation. Except for this difference in the mode of operation in the system according to Fig. 9, the system operates the same as the system heretofore described in detail, each group being a two station group comparable to the two station group C as illustrated in the block diagram of Fig. 2, the circuits of which have been disclosed in detail. It should be understood that the circuits shown and described in detail for the control of track switches and signals in group C as shown and described in the main form of the present invention are typical of those that are provided according to the block diagram of Fig. 9 for the respective two station groups.

Having thus described embodiments of the present invention as applied to a switch and signal control system for a specific simple track layout, it is to be understood that this form of the disclosure has been presented as a means of illustrating the principles and mode of operation of various parts of the system rather than to limit the number of forms that the present invention may assume, and it is to be further understood that various adaptations, alterations, and modifications may be applied to the specific form shown within the spirit and scope of the present invention except as limited by the appending claims.

What we claim is:

1. A switch and signal control system for governing from a control office several spaced groups of track switches and signals disposed along a stretch of railway track comprising, a sectional master control panel at the control office for use selectively with the several groups having several identical panel sections, self-restoring electrical switches similarly disposed on each panel section for the designation respectively of the normal and reverse positions of a track switch and the opposite directions for which signals may be cleared in a selected group, manually operable designating means on the master control panel for the selection of the respective groups of track switches and signals that are to be subject to control by the actuation of said self-restoring switches on said master panel, track switch and signal control storage means at the control office for storage of control code selections for transmission to the respective track switches and signals in each of the respective groups, and code communication apparatus located at said office and at the spaced groups effective when initiated and when a particular group has been designated for then transmitting the respective stored control code selections for that group.

2. A switch and signal control system according to claim 1 wherein the self-restoring electrical switches are push buttons.

3. A switch and signal control system according to claim 1 wherein said track switch and signal control storage means includes relays for storing the selection of control codes.

4. A switch and signal control system according to claim 1 wherein fleeting means is provided at the control office for initiating the transmission of a signal clearing code to clear a given signal for passage of a second train in response to the reception of an indication at the control office that a first train has passed said given signal.

5. A switch and signal control system according to claim 1 wherein said storage means can be manually controlled to block the storage of a signal clearing code for a designated signal.

6. A switch and signal control system according to claim 1 wherein said storage means can be manually controlled to block the storage of a switch control code for a designated track switch.

7. A switch and signal control system according to claim 3 wherein said relays are maintained in their actuated positions after restoration of said self-restoring electrical switches to their normal positions.

8. A switch and signal control system according to claim 4 wherein said relays are of the magnetic stick type.

9. A switch and signal control system for governing from a control office several spaced groups of track switches and signals disposed along a stretch of railway track comprising, a sectional master control panel for use selectively with the several groups having several identical panel sections, self-restoring switches similarly disposed on each panel section for the designation respectively of the normal and reverse positions of a track switch and the opposite directions for which signals may be cleared in a selected group, a set of control buses for each of the panel sections, means for selectively energizing said control buses of each set in response to the selective actuation of said self-restoring switches on the associated panel, a first bank of code selecting devices at the control office for each of said groups of track switches and signals, means for selectively connecting said first bank of devices to a first one of said sets of buses in accordance with the designation of one of said groups to which a switch and signal control code is desired to be transmitted, a second bank of code selecting devices at the control office for at least one of the groups of track switches and signals, means for selectively connecting said second bank of devices to a second of said sets of buses in accordance with the designation of one of said groups to which a switch and signal control code is desired to be transmitted, manually operable designating means on said master control panel for designating said groups selectively one at a time, and code communication apparatus for communicating switch and signal control codes selected by said banks of devices to the track switches and signals at groups selectively, one at a time, as selected by said manual designating means.

10. A switch and signal control system according to claim 9 wherein the devices are relays, and wherein means is provided for maintaining the relays energized after said self-restoring switches are restored to their normal positions.

11. A switch and signal control system according to claim 10 wherein the relays are of the magnetic stick type.

12. A railway switch control system for controlling from a control office several spaced groups of track switches disposed along a stretch of railway track comprising, a sectional master control panel at the control office having several substantially identical adjoining panel sections, manually operable self-restoring electrical switches for each of the panel sections for the designation of normal and reverse controls respectively of a track switch and the number of panel sections corresponding to the maximum number of track switches to be controlled in any selected one of the groups, switch control storage relays at the control office for storage of control code selections for controlling the track switches of each of the groups, group selection means for selectively rendering said switch control relays of the different groups, one group at a time, selectively responsive to the actuation of said manually operable self-restoring switches on said master control panel, means for maintaining said relays in their picked up positions after restoration of said self-restoring switches, and code communication apparatus located at said office and at the spaced groups effective when initiated and when a particular group has been selected for then transmitting the respective stored control code selections for that group.

13. A railway switch control system for controlling from a control office several spaced groups of track switches disposed along a stretch of railway track comprising, a sectional master control panel at the control office for use selectively with the several groups having several substantially identical adjoining panel sections, the number of panel sections corresponding to the maximum number of track switches to be controlled in any selected one of the groups, manually operable self-restoring electrical switches similarly disposed on each of the panel sections for the designation of normal and reverse controls of a track switch, switch control relays at the control office for each of the track switches for selecting switch control codes, group selecting means for selectively rendering said switch control relays of the different groups, one group at a time, selectively responsive to the actuation of said manually operable self-restoring switches on said master control panel, means for maintaining said relays in their picked up positions after restoration of said self-restoring switches, code communication apparatus partly at the control office and partly at the location of the different groups of track switches for selectively communicating control codes selected by said relays from the control office to the associated track switches, and switch control means at each of the spaced groups for operating the track switches in accordance with switch control codes communicating from the control office.

14. A centralized traffic control system for governing from a control office several spaced groups of track switches and signals disposed along a stretch of railway track comprising, a master control panel at the control office for use selectively with the several groups having several substantially identical panel sections, self-restoring electrical switches similarly disposed on each panel section for designation of controls for a track switch and signals of any selected one of the groups, a bank of code selecting relays at the control office for each of the groups, group selecting means at the control office effective when actuated to render said master control panel effective to selectively control the several banks of code selecting relays, one bank at a time, pick-up circuit means governed by said group selecting means for selectively energizing said code selecting relays of the relay bank selecting codes for the group selected by said group selecting means in accordance with the actuation of said self-restoring electrical switches on said master control panel, stick circuit means for maintaining said bank of relays for each group energized during a time when said group selecting means is effective to select some other group for selective energization in response to the actuation of the self-restoring electrical switches on the master control panel, code communication apparatus at said office and at the spaced groups effective when initiated and when a particular group has been designated for then transmitting the respective stored control codes selected by the relay bank belonging to that group, and means for governing the track switches and signals in each of the groups in accordance with the codes communicated from the control office by said code communication apparatus.

15. A centralized traffic control system according to claim 14 wherein the number of panel sections provided on the master control panel corresponds to the greatest number of track switches in any one of the groups.

16. A centralized traffic control system according to claim 14 wherein some of the relays of each of the relay banks are for storage of switch control codes and other relays are for the storage of signal control codes.

17. A centralized traffic control system for governing from a control office several spaced groups of signals disposed along a stretch of railway track comprising, a master control panel at the control office for use selectively with the several groups having several substantially identical panel sections, self-restoring electrical switches similarly disposed on each panel section for designation of controls for signals at a location within any selected one of the groups, a bank of signal control code selecting relays for each of the groups for storing the selection of signal control codes, group selecting means at the control office effective when actuated to render the self-restoring electrical switches on said master control panel effective to selectively control the several banks of code selecting relays, one bank at a time, pick-up circuit means governed by said group selecting means for selectively energizing said code selecting relays of the relay bank belonging to the group selected by said selecting means in accordance with the actuation of said self-restoring electrical switches on said master control panel, stick circuit means for maintaining said bank of signal control code selecting relays for each group energized during a time when said group selecting means is effective to select some other group for selective energization in response to the actuation of the self-restoring electrical switches on the master control panel, code communication apparatus partly at the control office and partly at the spaced groups effective when initiated and when a particular group has been designated for then transmitting the respective stored control codes selected by the relay bank belonging to that group, and means for governing the signals at the signal locations in each of the groups in accordance with the codes communicated from the control office by said code communication apparatus.

18. A centralized traffic control system according to claim 17 wherein an indication is communicated from the location of a given signal to the control office in response to the passage of a train past that signal and the reception of the indication at the control office is effective to deenergize said stick circuit means for a particular signal code selecting relay employed in the selection of codes for communication to said given signal.

19. A switch and signal control system for governing from a control office several spaced groups of track switches and signals disposed along a stretch of railway track comprising, a sectional master control panel at the control office for use selectively with the several groups having several identical panel sections, self-restoring electrical switches similarly disposed on each panel section for the designation respectively of normal and reverse positions of a track switch and the opposite directions for which signals may be cleared in a selected group, manually operable group designating means on the master control panel for the selection of the respective groups of track switches and signals that are to be subject to control by the actuation of said self-restoring switches on said master panel, track switch and signal control storage means at the control office for storage of control code selections for the respective track switches and signals in each of the respective groups, code communication apparatus located at the control office and at spaced groups effective when initiated and when a particular group has been designated for then transmitting the respective stored control code selections for that group, a fleeting control storage relay for a given signal, means including a manually operable electrical switch on the control panel for energizing said fleeting control storage relay in response to manual designation when the group including said given signal is selected by said group designating means, said fleeting relay being maintained energized until restored by manual designation, and fleeting means effective only when said fleeting relay is energized for transmitting a signal clearing code as selected by said storage means to said given signal in response to the reception of an indication at the control office that a train has passed said given signal.

References Cited in the file of this patent

UNITED STATES PATENTS

| 2,090,912 | Hailes | Aug. 24, 1937 |
| 2,152,384 | Lewis | Mar. 28, 1939 |
| 2,152,390 | Snavely | Mar. 28, 1939 |
| 2,176,600 | Agnew | Oct. 17, 1939 |
| 2,197,130 | Lewis | Apr. 16, 1940 |
| 2,229,736 | Hailes | Jan. 28, 1941 |
| 2,832,901 | Turner | Apr. 29, 1958 |